(12) United States Patent
DeLean

(10) Patent No.: US 9,274,607 B2
(45) Date of Patent: Mar. 1, 2016

(54) AUTHENTICATING A USER USING HAND GESTURE

(71) Applicant: Bruno DeLean, Andorra la Vella (ID)

(72) Inventor: Bruno DeLean, Andorra la Vella (ID)

(*) Notice: Subject to any disclaimer, the term of this patent is extended or adjusted under 35 U.S.C. 154(b) by 400 days.

(21) Appl. No.: 13/837,689

(22) Filed: Mar. 15, 2013

(65) Prior Publication Data

US 2014/0267009 A1    Sep. 18, 2014

(51) Int. Cl.
| | |
|---|---|
| G06K 9/00 | (2006.01) |
| G06K 9/46 | (2006.01) |
| G06K 9/48 | (2006.01) |
| G06K 9/62 | (2006.01) |
| G06F 3/041 | (2006.01) |
| G06F 3/01 | (2006.01) |
| G06F 21/31 | (2013.01) |

(52) U.S. Cl.
CPC .............. *G06F 3/017* (2013.01); *G06F 21/31* (2013.01); *G06K 9/00355* (2013.01)

(58) Field of Classification Search
CPC ............ G06K 9/00; G06K 9/10; G06K 9/46; G06K 9/52; G06K 9/62; G06F 21/00; G06F 3/017; G06F 3/0488; G06F 3/04883; G09G 5/00; G06N 3/02
See application file for complete search history.

(56) References Cited

U.S. PATENT DOCUMENTS

| | | |
|---|---|---|
| 3,699,517 A | 10/1972 | Dyche |
| 4,286,255 A | 8/1981 | Siy |
| 4,524,454 A | 6/1985 | Ejiri |
| 4,653,107 A | 3/1987 | Shojima et al. |
| 5,434,928 A | 7/1995 | Wagner et al. |
| 5,544,261 A | 8/1996 | Bellegarda et al. |
| 5,732,154 A | 3/1998 | Dai |
| 5,740,273 A | 4/1998 | Parthassaraathy et al. |
| 5,828,772 A | 10/1998 | Kashi et al. |
| 6,052,481 A | 4/2000 | Grajski et al. |
| 6,289,124 B1 | 9/2001 | Okamoto |
| 6,339,655 B1 | 1/2002 | Aharonson et al. |
| 6,721,452 B2 | 4/2004 | Confer et al. |
| 6,920,231 B1 | 7/2005 | Griffin |
| 7,068,821 B2 | 6/2006 | Matsutani |
| 7,389,208 B1 | 6/2008 | Solinsky |
| 7,529,391 B2 | 5/2009 | Lin et al. |
| 7,630,551 B2 | 12/2009 | Koubaroulis et al. |
| 7,657,849 B2 | 2/2010 | Chaudhri et al. |
| 7,715,600 B2 | 5/2010 | Avni et al. |
| 7,869,634 B2 | 1/2011 | McOwan et al. |
| 7,925,062 B2 | 4/2011 | Arai |
| 2005/0100214 A1* | 5/2005 | Zhang ................ G06K 9/222 382/179 |
| 2005/0253817 A1 | 11/2005 | Rytivaara et al. |
| 2008/0130996 A1* | 6/2008 | Sternby .............. G06K 9/00872 382/179 |

(Continued)

*Primary Examiner* — Charles Hicks
*Assistant Examiner* — Nguyen H Truong
(74) *Attorney, Agent, or Firm* — Fogg & Powers LLC

(57) ABSTRACT

The present document describes a method for authenticating a user into a system using gestures. The user may draw the gesture on a touch sensitive device (e.g. touchpad), or make the gesture in the air in front of a camera. In the touchpad embodiment, the trajectory defined by the gesture is received ready from the touchpad. In the camera embodiment, the trajectory is built by analyzing the images of an image stream to find a hand (or another subject i.e. meta-subject). The trajectory may then be built by monitoring the change of position of the hand in the succession of images. The trajectory is analyzed to determine the key-code defined by the gesture, and to determine whether or not it is the authenticated user who is performing the gesture (as opposed to an intruder) based on the speed and the distance between the trajectory and a straight line.

67 Claims, 16 Drawing Sheets

(56) References Cited

U.S. PATENT DOCUMENTS

2011/0187497 A1 8/2011 Chin
2011/0251954 A1 10/2011 Chin
2014/0267736 A1 9/2014 DeLean \* cited by examiner

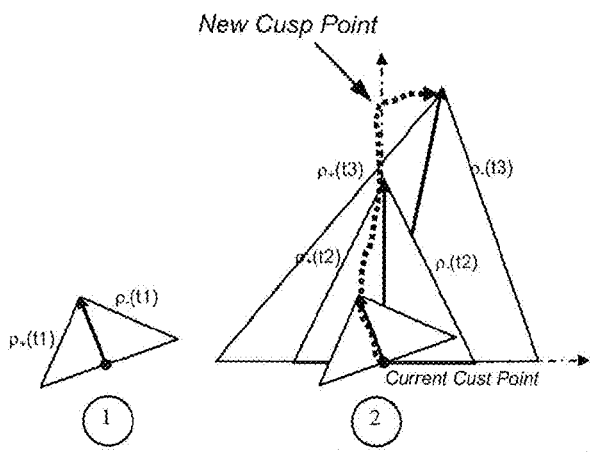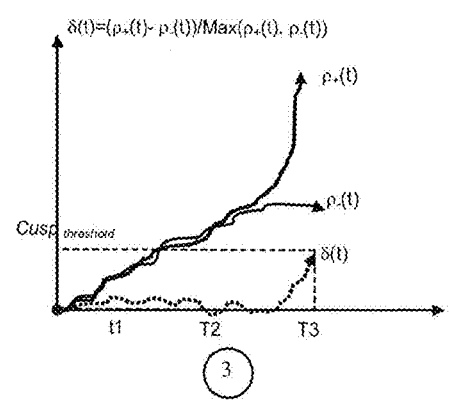
FIGURE 4a    FIGURE 4b    FIGURE 4c
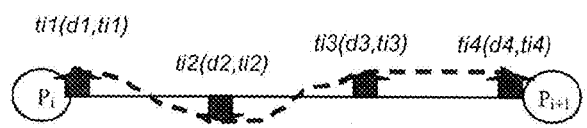
FIGURE 5a
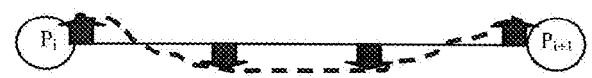
FIGURE 5b User Number is 24

Key-code with any shape is 14214636

AUTHENTICATING A USER USING HAND GESTURE

BACKGROUND (a) Field

The subject matter disclosed generally relates to a system and method for authenticating a user using a hand gesture.

(b) Related Prior Art

The traditional authentication methods of using a user name and password to have access into a system have become easy to hack. Most of the new electronic devices are now equipped with sensors including for example touchpad, touch screen, camera, biometric sensors and so on.

Several attempts have been made in the past to use these sensors in order to prevent unauthorized access to these devices.

For example, using a touchpad it is possible to authenticate a user using a method based on secrecy of a location. For example, the user may be asked to drag an icon to a secret place on the screen, or to enter a secret code or secret gesture using a keyboard/touchpad whereby the user may be authenticated using a corridor of allowed trajectory.

However, these authentication methods are not secure enough and may be easily compromised especially when the gesture/code is caught or eavesdropped by a third party.

Furthermore, several methods exist for duplicating and forging the data detected by biometric sensors. For example, it is possible to obtain the fingerprint of a user on a certain medium e.g. film, and applying the medium on the fingerprint sensor in order to have access to the system.

Therefore, there is a need for a method for interfacing with a machine which is both user friendly and secure.

SUMMARY

The present embodiments provide for such method.

It has been shown that there is always some uniqueness in the way each person moves their fingers, hands, and body parts. A proven method used for centuries is based on the unique feature of each human to have his or her own way of moving body part, like in the case of a traditional hand written signature.

In an embodiment, the uniqueness in the moves can be identified if the moves are repeated enough to allow the user to have confidence that their gestures are similar when repeating the same move. Accordingly, the embodiments analyze the uniqueness intrinsic to the gesture, in order to allow user identification and at same time have enough discrimination to avoid third party access by imitating the gesture.

The fundamental difficulties lye in the quantization and automation of the analysis process, as computer are technically predictable and expecting predictable behavior. However, the embodiments allow for capturing the user movement and for making a unique characterization of the gesture in a way that amplifies user intrinsic behavior, which allows the user to have a reasonable capability to fluctuate the gesture, and still block another user from successfully authenticating into the system.

In an embodiment, the computer/system behaves like an expert analyzing hand written signature but looking first for the details even eventually before the trajectory (as in the shape defined by the gesture). Accordingly, the embodiments use a trajectory-capturing device like a touchpad/touch screen/camera etc. to enter information to an analyzer that will compare the gesture to a classified set created during an assisted learning phase. The information is used by the analyzer to either allow access to the system or to deny it.

In the present document, the term meta-subject has been used to indicate a subject that is being used by the user to make the gesture. In the preferred embodiment, the meta-subject may include a hand. However, other embodiments are possible including for example, a head, eye, hand, fist, neck, ear, etc. or any other body part. Other embodiments are also possible wherein the meta-subject is a physical object that excludes body parts e.g. a remote control, tennis racket, a knife, a glove, or simply any object that may be detected by a camera.

In an embodiment, there is provided a computer implemented method for authenticating a user into a system using a gesture drawn by the user, the method comprising: dividing a trajectory defined by said gesture into a plurality of portions; defining, for each portion, a virtual segment based on an average direction of the portion; measuring a difference ($\delta$) between the virtual segment and the trajectory associated therewith at a number n of different locations within the trajectory, thus obtaining a set of $\delta_{i=1-n}$; classifying each set of $\delta_{i=1-n}$ as a sample point in a multidimensional space of at least n dimensions, said multidimensional space including sample points for the user (Yes samples) and sample points for other people (No samples); determining for each set of $\delta_{i=1-n}$ a probability that the portion associated with that set is drawn by the user, said determining comprising: 1) counting a number of Yes samples and a number of No samples within a predefined volume around the sample point associated with the set of $\delta_{1-n}$; 2) calculating a first ratio of Yes samples versus No samples within the predefined volume; and 3) dividing the first ratio by a second ratio representing the number of Yes samples versus No samples in the entire multidimensional space, to produce said probability. The method further comprises aggregating the probabilities associated with each portion to produce an aggregated probability for the gesture; and outputting said aggregated probability to the system for comparison with a predetermined threshold to take an authentication decision based on said comparison.

In an embodiment, the method comprises associating a value representing a direction to each virtual segment; and classifying the set of $\delta_{i=1-n}$ associated with the virtual segment in an n+1 dimensional space comprising one dimension for each $\delta_i$ and one dimension for the value.

In a further embodiment, the method comprises determining the value by comparing the virtual segment to a cardinal direction vector, wherein the value is an integer representing a number associated with one of the direction vectors.

In an embodiment, the method comprises concatenating the values associated with the virtual segments into a key-code, and outputting the key-code to the system for verification with a predefined key-code.

In a further embodiment, the method further comprises, if the key-code matches the predefined key-code, and the aggregated probability is lower than the predetermined threshold preventing the user from accessing the system.

In a further embodiment, the cardinal direction vector comprises eight direction vectors. In an embodiment, $\delta=4$, and the multidimensional space comprises 5 dimensions.

In a further embodiment, the method comprises setting the size of the volume around the sample point as a function of a density of the multidimensional space such that the volume contains a predefined percentage of an entire count of samples in the multidimensional space.

In a further embodiment, the method comprises setting the size of the volume around the sample point as a function of a smallest volume that may be found in the multidimensional space which includes a specific number of Yes samples.

In a further embodiment, the method comprises performing a learning phase, said learning phase comprising: prompting the user to perform said gesture for a number of times; repeating the steps of detecting to classifying for each gesture; and classifying the sample points associated with each gesture in the multidimensional space as YES samples.

In a further embodiment, the method comprises receiving the trajectory from a touch sensitive device.

In a further embodiment, the method comprises building said trajectory from an image stream showing the gesture made using a meta-subject.

In a further embodiment, the method comprises detecting a meta-subject and a position of said meta-subject in the image stream, and building said trajectory based on a sequential change of positions of the meta-subject in the image stream. In a further embodiment, detecting comprises scanning each image of the image stream in search for the meta-subject using a pre-loaded image of the meta-subject.

In a further embodiment, the method comprises convoluting the images of the image stream and the pre-loaded image of the meta-subject and performing the comparison on binary versions of the images.

In a further embodiment, scanning comprises: dividing a given binary image of the image stream into a plurality of areas; providing different versions of the binary image of the meta subject, each version having a different resolution, and dividing each version into one or more tiles, thus producing a number m of tiles from all the different versions; performing a sum of square difference (SSD) between each area of the given image and each tile, to produce a set of SSD values including m SSD values; classifying said set of SSD values as a sample point in an m-dimensional space including sample points representing images that include only the meta-subject (Yes samples) and images that do not include the meta-subject (No samples); counting a number of Yes samples and a number of No samples within a predefined volume around the sample point associated with the area; calculating a third ratio of Yes samples versus No samples within the predefined volume; and dividing the third ratio by a fourth ratio representing the number of Yes samples versus No samples in the entire m-dimensional space, thus producing an image-probability indicative of the presence of the meta-subject in the given image.

In a further embodiment, the method comprises outputting a position of the meta-subject in the given image if the image-probability is greater than a predetermined threshold.

In a further embodiment, the method comprises outputting a size of the meta-subject in the given image.

In a further embodiment, the method further comprises setting dimensions of the areas based on the size of the meta-subject found in the given image.

In yet a further embodiment, the method comprises morphing the binary image in a plurality of dimensions to produce morphed versions of the image of the meta-subject, repeating the steps of providing and performing for each morphed version to produce a plurality of sets of SSD values for each area; and outputting the SSD set having the lowest values for classification in the m-dimensional space.

In yet a further embodiment, adjacent areas of the given image may have overlapping pixels. In another embodiment, each area is shifted by four pixels with respect to the next/previous area.

In yet a further embodiment, the image of the meta-subject is a body part. In an embodiment, the body part may be one of: eye, hand, head, fist, neck, ear. In another embodiment, the image of the meta-subject is pre-loaded.

In another embodiment, the image of the meta-subject is received by the user and represents a body part of the user. In a further embodiment, the image of the meta-subject is pre-loaded and represents a body part of someone other than the user. In another embodiment, the meta-subject is a physical object excluding body parts.

In yet a further embodiment, the method comprises loading the sample points from a local database, a remote server, or both thereof.

In an embodiment, each sample point in the m-dimensional space represents a set of m-values associated with a different image.

The method may further comprise scanning the image to detect an additional meta-subject, and upon detection of said additional meta-subject in the given image, increasing the image-probability.

In yet a further embodiment, the method comprises detecting an average duration for performing the gesture; and upon authentication, analyzing portions of the trajectory that are received within said average duration, thereby introducing errors that disqualify gestures that are slower or faster than the user gesture.

In another aspect, there is provided a computer implemented method for authenticating a user into a system using a gesture drawn by the user, the method comprising: dividing a trajectory defined by said gesture into a plurality of portions; defining, for each portion, a virtual segment based on an average direction of the portion; measuring a difference ($\delta$) between the virtual segment and the trajectory associated therewith at a number n of different locations within the trajectory, thus obtaining a set of $\delta_{i=1-n}$; classifying each set of $\delta_{i=1-n}$ as a sample point in a multidimensional space of at least n dimensions, said multidimensional space including sample points for the user (Yes samples) and sample points for other people (No samples); determining for at least one set of $\delta_{i=1-n}$ a probability that the portion associated with that set is drawn by the user, said determining comprising: 1) counting a number of Yes samples and a number of No samples within a predefined volume around the sample point associated with the set of $\delta_{1-n}$; 2) calculating a first ratio of Yes samples versus No samples within the predefined volume; and 3) dividing the first ratio by a second ratio representing the number of Yes samples versus No samples in the entire multidimensional space, to produce said probability. The probability associated with each portion may be output to the system for comparison with a predetermined threshold to take an authentication decision based on said comparison.

In a further aspect, there is provided a method for detecting a meta-subject in a first image, said method comprising: dividing the first image into a plurality of areas; receiving a second image representing the meta-subject, and providing different versions of said second image, each version having a different resolution; convoluting the first image and the different versions of the second image; dividing each version into one or more tiles, thus producing an m number of tiles from all the different versions; performing a sum of square difference (SSD) between each area of the first image and each tile, to produce a set of SSD values including an m number of SSD values; classifying said set of SSD values as a sample point in an m-dimensional space including sample points representing images that include only the meta-subject (Yes samples) and images that do not include the meta-subject (No samples); counting a number of Yes samples and a number of No samples within a predefined volume around the sample point associated with the area; calculating a first ratio of Yes samples versus No samples within the predefined volume; and dividing the first ratio by a second ratio representing the number of Yes samples versus No samples in the entire m-dimensional space, thus producing an image-probability indicative of the presence of the meta-subject in the first image.

In yet a further aspect, there is provided an apparatus for authenticating a user into a system using a gesture drawn by the user, the system comprising: a trajectory analyzer adapted to: divide a trajectory defined by said gesture into a plurality of portions, define, for each portion, a virtual segment based on an average direction of the portion; and measure a difference ($\delta$) between the virtual segment and the trajectory associated therewith at a number n of different locations within the trajectory, to obtaining a set of $\delta_{i=1-n}$. The apparatus also comprises an authentication module adapted to: classify each set of $\delta_{i=1-n}$ as a sample point in a multidimensional space of at least n dimensions, said multidimensional space including sample points for the user (Yes samples) and sample points for other people (No samples); and determine for each set of $\delta_{i=1-n}$ a probability that the portion associated with that set is drawn by the user, by counting a number of Yes samples and a number of No samples within a predefined volume around the sample point associated with the set of $\delta_{i=1-n}$; calculating a first ratio of Yes samples versus No samples within the predefined volume; and dividing the first ratio by a second ratio representing the number of Yes samples versus No samples in the entire multidimensional space, to produce said probability. A probability aggregator may also be included for aggregating the probabilities associated with each portion to produce an aggregated probability for the gesture, wherein the aggregated probability is sent to the system for comparison with a predetermined threshold to take an authentication decision based on said comparison.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. The terms comprising and including should be construed as: including but not limited to.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 4a to 4c illustrate a method for determining cusp points in accordance with an embodiment;

FIGS. 5a and 5b illustrate examples of features extraction from regression paths;

It will be noted that throughout the appended drawings, like features are identified by like reference numerals.

DETAILED DESCRIPTION

The embodiments will now be described more fully hereinafter with reference to the accompanying drawings, which form a part hereof, and which show, by way of illustration, specific embodiments by which the embodiments may be practiced. The embodiments are also described so that the disclosure conveys the scope of the invention to those skilled in the art. The embodiments may, however, be embodied in many different forms and should not be construed as limited to the embodiments set forth herein.

Among other things, the present embodiments may be embodied as methods or devices. Accordingly, the embodiments may take the form of an entirely hardware embodiment, an entirely software embodiment, an embodiment combining software and hardware aspects, etc. Furthermore, although the embodiments are described with reference to a portable or handheld device, they may also be implemented on desktops, laptop computers, tablet devices or any computing device having sufficient computing resources to implement the embodiments.

The present embodiments describe a system and method for determination of a gesture made by a user and delivered as a key-code for authenticating a user into a computing device (aka system) using hand gestures. In an embodiment, the hand gestures are captured using a gesture capturing device such as a camera (e.g. video camera) or touch sensitive media (e.g. touchscreen or touchpad) which is operably connected to and/or embedded in the system. The system could be a tablet, a laptop, portable device or any electronic device having the hardware and the processing resources that allow it to implement the embodiments.

Figure 1:
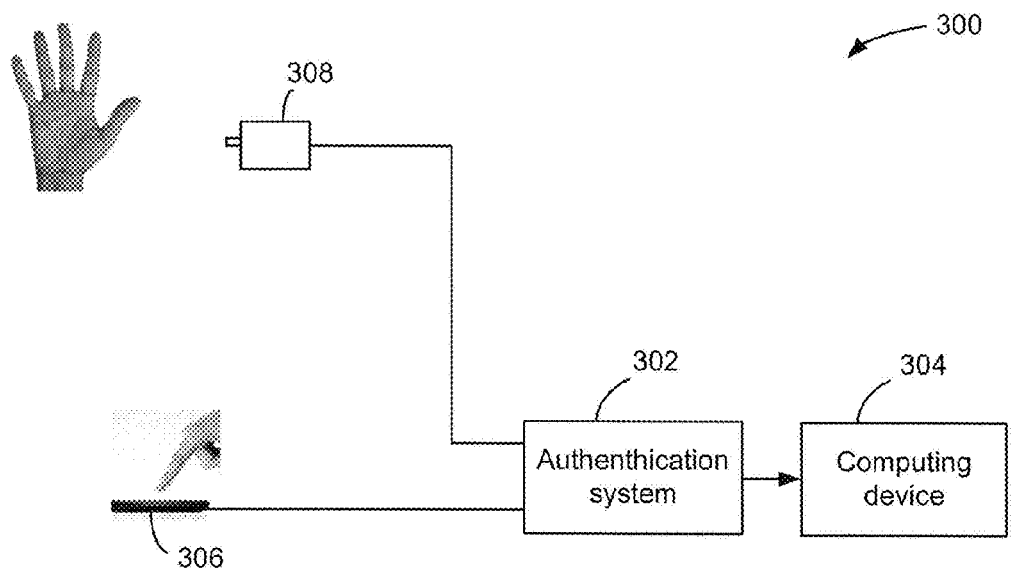
FIG. 1 is a block diagram of an exemplary system for authenticating a user into a system using hand gestures, in accordance with an embodiment.

FIG. 1 is a block diagram of an exemplary system for authenticating a user into a system using hand gestures, in accordance with an embodiment. As shown in FIG. 1, the system 300 includes an authentication system 302 operably connected to a system 304. It is to be noted that the authentication system 302 is shown as being a separate component. However, the authentication system 300 may be implemented within the system 304 as a software component, hardware component or a combination of both. It is also possible that the authentication system be implemented as a separate component which outputs its verification results to the system 304 to take an authentication decision.

In a further embodiment, the authentication system may be used to provide its output to a third party system over a telecommunications network. This embodiment may be used in a variety of applications including banking, verification systems providing access to buildings or secure areas within a building, login to a machine, selecting a "pay per view" channel, or securing a online banking or reservation transactions, etc.

Referring back to FIG. 1, the authentication system 302 may receive its input from either a touch sensitive surface 306 such as touchscreen, touchpad of the like (where the user may input the gesture using a finger or a pen or the like), or from an image capturing device 308 such as a video camera. It is also to be noted that the embodiments may operate in computing devices including either or both input sources. For example, a tablet device includes a touchscreen and a camera. Therefore, both embodiments may be implemented in such computing device, whereby the user may choose one of the two embodiments in order to authenticate into the tablet.

Figure 1A:
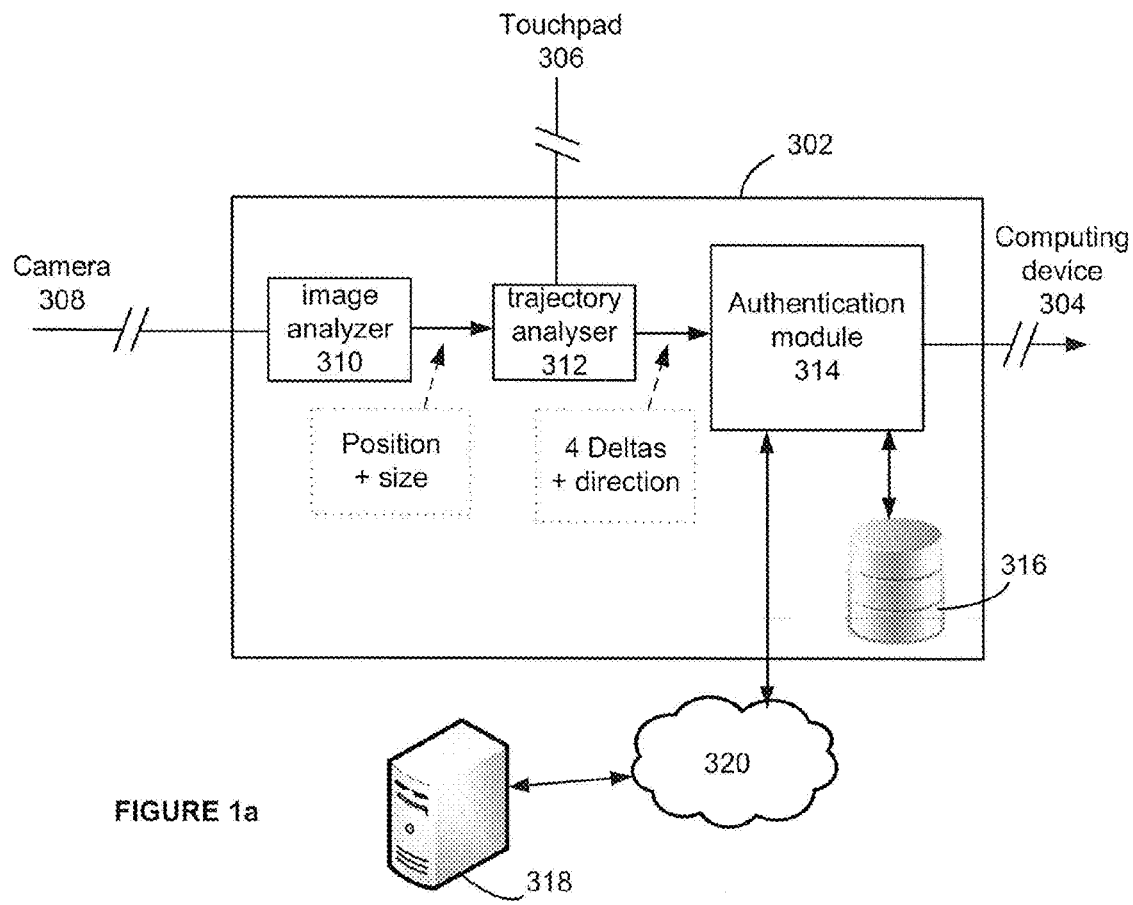
FIG. 1a is a block diagram of an exemplary authentication system, in accordance with an embodiment.

FIG. 1a is a block diagram of an exemplary authentication system 302, in accordance with an embodiment. In an embodiment, the authentication system 302 extracts the coordinates of the hand gesture, and the timestamp associated with each coordinate. As illustrated in FIG. 1a, the module 302 includes an image analyzer 310 which is adapted to receive the output of the camera 308 to extract the coordinates and timestamps of the hand gesture, in order to output the position of the hand (whereby a succession of images may define the trajectory) and size of the hand. This will be described in further detail herein below.

The system 302 may also include a trajectory analyzer 312 adapted to analyze the trajectory defined by the gesture made by the user. The trajectory analyzer 312 may receive its input from either the touchpad 306 or the image analyzer 310. The trajectory analyzer 312 analyzes the trajectory defined by the user gesture, breaks the trajectory into a series of segments, and outputs for each segment a set a set of deltas defining the difference between an ideal rectilinear trajectory based on the gesture and the specific but natural human jitter i.e. trajectory defined by the gesture (as shown in FIGS. 5a and 5b). The trajectory analyzer outputs a set of four deltas for each segment and the direction in which the segments are going (based on the position of the end point with respect to the start point). The authentication module 314 may have access to a local database 316 and/or to a remote server 318 over a telecommunications network 320 in order to compare the intrinsic of the user's gesture to a bank of information including sample points for the user and for other people and provide a probability that the gesture belongs to the user. Based on said probability, the system 304 or the authentication module 314 itself may take an authentication decision. This will also be described in further detail hereinbelow.

In an embodiment, operation of the system comprises two phases: a learning phase and an authentication phase (once the learning phase is achieved satisfactorily). During the authentication phase, the user produces gestures in front of a camera or on the touch screen or touchpad. This may be done without visual interaction. The sampled gesture may exhibit a path that the system converts to a key-code. In an embodiment, the system may also qualify the intrinsic of the way the gesture is done by the user to deliver a confidence factor. During the learning phase, position samples are received as well as the timestamp associated with sample. In an embodiment, the process may begin by a first filtering phase to eliminate obvious criteria like too short, too irregular segments, and to organize data relative to entry point (session start) to allow coordinates to be in a relative mode to the screen.

Subsequently, the process may perform a feature extraction phase to extract from each gesture the length and deviation to a main trajectory (ideal trajectory) to deliver a subset of information that will be assembled in a vector (aka set of Deltas $\delta_{i=1-n}$) that will be classified using a pre-learned Knowledge base and a probabilistic method. The probabilistic approach determines whether or not the data matches an existing class of direction and of way to gesture it. Subsequently, the class is qualified by an enumerating process to determine the number of known feature points that are close to feature points from sampled data. Once aggregated this allows to qualify the recognition of the gesture in terms of probability, as will be described in further detail hereinbelow.

The process classifies the signature in an P-dimensional vector. As the system evolves, the probability analysis uses an enumeration around a volume centered on the submitted sample in the multidimensional space, where good aspect of gesture should cluster naturally so that fundamentally a party/intruder with intention to forge will have great difficulty to imitate the features of the gesture that are specific to the authenticated user. This enumeration process is arranged to qualify the uniqueness as well as the repeatability of the gesture. One of the main benefits of this method is that it allows, during the learning phase, for a direct control by the user of the minimal required gesture to achieve the level of security intended by the user or by the authority that requires authentication.

The user may be guided to increase the complexity of the gesture (if needed) by addition of new movements at the end of existing known sequence. With the experience and the repeatability of the signature drawing, the user will increase the confidence in the movement and its smoothness. The process may then refine the features of the signature for the known class allowing natural narrowing of repeatability, and providing for a better selectivity of the user class amongst others and improving the uniqueness. In an embodiment, the process may update the signature features as the user's confidence and movement smoothness increase.

Feedback Method

In an embodiment, a feedback method may be used during the training e.g. returning a probabilistic coefficient of uniqueness, to inform the user that the enhanced gesture is sufficiently secure/complicated. The confidence factor and gesture captured by the system may then be displayed to the user The feedback method may be implemented in an assisted method, whereby the user may have a permanent feedback of the performance of his/her gesture. In a non-limiting example of implementation, the feedback can be in the form of a barograph going from red to green or a beep that sound when the target security level is reached.

The feedback method may be also be implemented in a non-assisted method, whereby the gesture may be done and a criteria (e.g. number, percentage, etc.) is delivered at the end.

The feedback info may come from the aggregation of two types of information: the uniqueness of the signature and the repeatability of the gesture, e.g. the number of time user can repeat the gesture during the learning phase. The uniqueness has to be understood as uniqueness amongst human species which requires asserting it from a database of classified movements from a pre-qualified and correctly sampled set of users. The uniqueness is qualified by the density of non-user samples that have similar Deltas to the user, while the repeatability is qualified by the dispersion or local density of user own Deltas. In other words, the uniqueness is represented by the number of "no" samples in vicinity of user sample being analyzed whereby the higher the number of "no" samples the less unique is the user sample. By contrast, the repeatability is represented by the number of "Yes" samples around the user samples. The higher the number of "Yes" samples indicates that the user can produce similar gestures without too much deviations.

The samples used for comparison may either be stored in a local database, or may be stored in a remote server which is accessible over a telecommunications network. For example, as shown in FIG. 1a the samples may be stored in a permanent data bank in the system (e.g. local database 316 in FIG. 1a, or a SIM card or the like), or in a remote server 318. In another example, the samples may be obtained from a remote server 318 over a telecommunications network 320.

In a non-limiting example of implementation, the database 316 and the remote server 318 may be used to update each other the samples. In particular, the local database 316 becomes richer with repetitive use, whereby the user's samples cluster to define a certain volume in the multidimensional space. Similarly, the server 318 becomes richer as more users subscribe, and as more individual databases 316 provide more samples from the users associated therewith. The embodiment where the system 302 connects to the server 318 allows for estimating the uniqueness amongst all the known users that registered a gesture.

This also allows for warning the user that the complexity of the chosen gesture has to be increased to match a certain level of security, as the needs dictate. For example, some banks require a PIN code to be at least 4 digits, and some others require the PIN code to include 5 or 6 digits depending upon their policy.

In an embodiment, to be acceptable and without being a limiting factor, the uniqueness does not need to exceed $1/10000$ or $1/1000000$, as being more unique than respectively 4 digits or a 6 digits PIN code and still be accepted as a safe method for authenticating users For example as Banks typically require only 4 to 6 digits PIN. Tests show then that a sampling of over 1000 chosen gestures, taken from different users, creates sufficient data for the analysis process for qualifying uniqueness, at least without requiring online connection.

In another embodiment, the samples used to qualify users can easily be stored in a repository that contains gestures of all users connected to a service. This allows analysis across all users which then at least allows to qualify relative uniqueness factor across all know users and de facto increases the knowledge base to qualify uniqueness in absolute.

The repeatability factor is determined during the learning phase but may also be re-qualified in a narrowing mode during usage. As the user practices its gesture, the automatism to do it will improve the regularity of the gesture itself, which then allows the decision to be taken to eventually increase the constraint on the gesture which increases the security of the process. This may be obtained by repeating the drawing (aka gesture) several times and providing a similarity factor between all the signatures.

When the gesture is qualified, the system may register the deltas found during analysis as a new Known sample in the database. This allows to use a method that adjusts and decreases the size of the volume used for analysis, still keeping the same chosen number of "yes" in the volume, which decreases the chance to have "no" sample within this volume, which then increases the ratio "yes"/"no" which increase the discrimination and repeatability.

The access to an increased number of non-user samples will increase the number of "no" samples, hence when the user Deltas are analyzed, the local density of "no" rated with the total number of "no" will emphasize the uniqueness.

As discussed above, the system 302 may receive the gestures from a touchpad 306. In this case, the coordinates are directly supplied to the system for signature analysis.

However, when a video input is used, the system 302 needs a hand detection method. In an embodiment, the hand detection method is implemented in the image analyzer 310. The gesture learning phase and the authentication phase apply the same hand detector, the system may use a generic hand or an improved embodiment may ask users to replace the generic hand by a picture of their own hand. This implementation allows for increasing the chance that the detector finds a hand in the submitted image.

Figure 2:
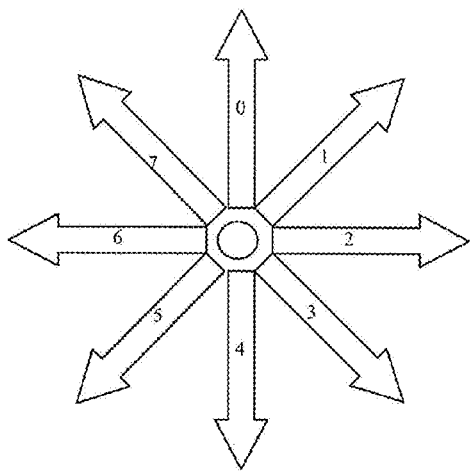
FIG. 2 is an example of a cardinal direction vectors for classifying the segments of the trajectory into key-codes, in a non-limiting example of implementation.
Figure 3A:
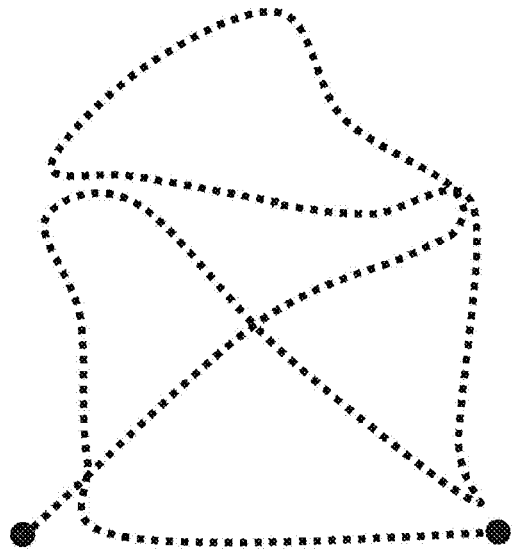
FIG. 3a is an example of a trajectory shaped as a "virtual house", in accordance with an embodiment.
Figure 3B:
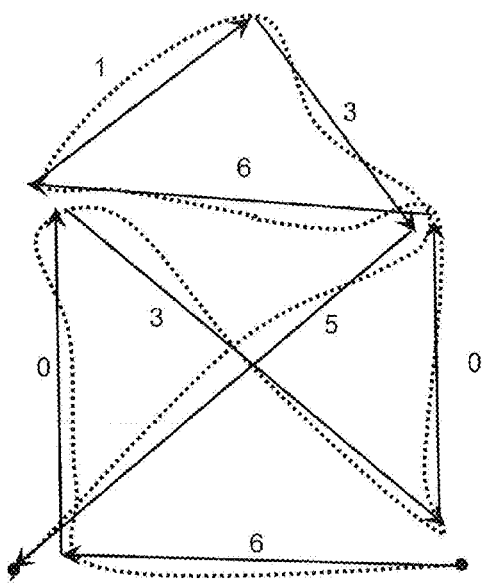
FIG. 3b illustrates the key codes for the trajectory of FIG. 3a following the cardinal direction vectors of FIG. 2.
Figure 3C:
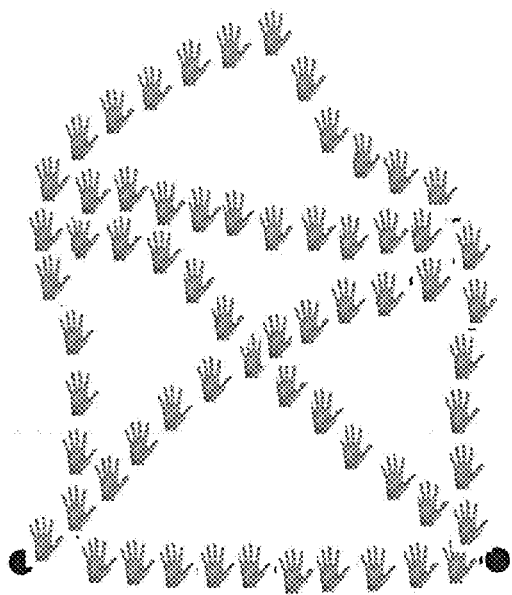
FIG. 3c illustrates the trajectory of FIG. 3a built from a succession of images (image stream)

The image analyzer 310 outputs the position and size of the hand along with a timestamp whereby the gesture may be constructed from a succession of images as illustrated in FIG. 3c. The next step would be to analyze the gesture to determine the differences between the user's gesture and an ideal gesture. These differences along with the time (speed) characterize the user and allow the system to determine whether the user should be authenticated or not Trajectory Processing As discussed with reference to FIGS. 1 & 1a, the authentication system 302 receives the trajectory (representing the gesture) drawn on a touchpad 306 or received from the image analyzer 310 to analyze it using the trajectory analyzer 312. In an embodiment, the gesture produced by the user is transformed into a key code and a qualification factor that the gesturing user is identifiable. FIG. 2 is an example of a cardinal direction vectors for classifying the segments of the trajectory into key-codes, in a non-limiting example of implementation. FIG. 3a is an example of a trajectory shaped as a "virtual house", in accordance with an embodiment. The trajectory may vary between a user and the other, whereby every user may select a trajectory that is easy for them to remember and repeat using hand gestures. FIG. 3b illustrates the key codes for the trajectory of FIG. 3a following the cardinal direction vectors of FIG. 2. In the present case, the key code for the trajectory is 60306135.

It should be noted that the embodiments are not limited to a cardinal vector having eight directions. The number of directions in the cardinal vector is an implementation decision that may use a number of deltas which is more or less than four without departing from the scope of the present disclosure.

Accordingly, in the present embodiment the gesture comprises a series of key codes that are composed of successive segments that follow "octagonal" directions e.g. following one of the 8 cardinal directions of FIG. 3b. Each key code is stored as an N-Dimension Vector (in main embodiment N=12) characterized by the following parameters:

pi(xi, yi) which is the cusp point corresponding to vector i.
Li is the normalized length of the vector, e.g. the length of the vector divided by the length of the first vector. For the first vector, its original length is kept.
ti0($\delta$i0, ti0), ti1($\delta$i1, ti1), ti2($\delta$i2, ti2), ti3($\delta$i3, ti3) are the four intermediate points, 2D each, corresponding respectively to the positions 0, 1/3, 2/3 1 on the segment,
$\delta$i is an indicator of the distance between the drawing and the segment: $\delta$i=di/maxi=1 . . . 4(di).

In an embodiment, the features extraction phase may involve the following:

1. Determination of Cusp Points

FIGS. 4a to 4c illustrate a method for determining cusp points in accordance with an embodiment. The first cusp point is the first point in the drawing as shown in FIG. 4a. Starting from the current cusp point, which at the beginning is the first point of the drawing, the next cusp point is determined as illustrated in FIG. 4b. The direction of the segment may be issued as an average of the directions from the first 10 points (e.g. pixels) of the drawing, then this direction is kept as the averaged direction of the segment, and the segment length is reported left and right orthogonally from the current point as shown in FIG. 4b.

In an embodiment, the function $\delta(t)=(\rho+(t)-\rho-(t))/\text{Max}(\rho+(t), \rho-(t))$ is calculated for each new point drawn on the curve at timestamp t, where $\rho+(t)$ and $\rho-(t)$ correspond respectively to the length of the hypotenuse of the left and right sided related triangle. As soon as the value $\delta(t)$ exceeds the Cusp threshold value as shown in FIG. 4c, a new Cusp Point is defined. The angles between directions (8 in present embodiment) may be determined by the maximum allowed for the radius of curvature of cusp point (as defined by the threshold shown in FIG. 4c).

2. Linear Regression

Linear regression is processed using all the acquired points between the current cusp point and the new one with min-squared method. The regression shall correspond to one of the 8 cardinal directions.

3. Determination of Related Values tik($\delta$ik, tik) where k=1.4

Following the previous steps, segment points at positions (0, 1/3, 2/3, 1) of the length, are determined and $\delta$i is the normalized orthogonal distance di from the drawn pixel to the segment and it is the time stamp of the point. $\delta$i=di/maxi=1.4 (di). The value can be positive or negative, depending on whether the point is in a clockwise direction or counterclockwise direction with respect to the oriented segment. FIGS. 5a and 5b illustrate examples of features extraction from regression paths. For example, referring to FIG. 5a, point ti2 may have a positive value while points ti1, ti3, and ti4 have negative values.

4. Signature Confirmation

The user may repeat the signature drawing (gesture) several times (at least four times), so that the system may confirm the validity of the code, and be able to proceed to the classification.

Pre-Classification Process

In the present embodiment, the segment recognition process outputs a set of four (which could be more or less) deltas ($\delta$1, $\delta$2, $\delta$3, $\delta$4) which represent the differences between an ideal straight line and the trajectory drawn by the user (taken at four places 0, 33%, 66%, 100% of each segment define by two successive cusp points as exemplified in FIG. 5a). These differences represent the key values that characterize/identify the user (aka intrinsic of the user).

The values of these deltas are sent to the authentication module 314 for processing and verification, along with the key code detected (in the present example the key code is 60306135 as illustrated in FIG. 3b). The process of classifying these values involves entering the set of values in a multidimensional space of all the known values for this user and of all values that other users may generate for approximation of segments. The embodiments employ a probabilistic method which is discussed below: the fundamental of the evaluation strategy imbedded in the system comprises rating the similarity to a set of learned Subject model (the movement of the user), and comparing this similarity to a set of non-Subject model (pre-recorded gestures of other people which are stored in a database).

The implementation discussed above has been discussed with respect to the trajectory being received from the touchpad 306 at the trajectory analyzer 312. However, it should be noted that the same analysis may be performed with respect to the camera embodiment. The difference being that the trajectory is built by the image analyzer 310 from a succession of images received from the camera 308, as exemplified in FIG. 3c which illustrates the gesture of FIG. 3a as captured from a succession of images (aka image stream) representing the movement of a user's hand in front of the camera 308. Therefore, for the sake of clarity the analysis will not be repeated herein.

In an embodiment, the size of the hand (once detected) may be used as a reference for establishing the length of the segment and subsequently the value of the deltas.

It should also be noted that the method is invariant in scaling. In other words, whether the gesture is made close or far from the camera or whether a bigger or smaller version of the gesture is drawn on the touchpad, the process can still perform the same analysis and provide the same results because the deltas are normalized with respect to the length of the associated segment. Needless to say, a minimum level of resolution has to be available for descent computation in the case where the gesture is performed in front of the camera.

Generic Classification

In an embodiment, a class is defined as being a collection of objects of a relevant similarity, relevant in the sense that they would have similar classifications by the system and this classification is useful to the purpose. for example and for the purpose of the apparatus, classifying hand from other body part can be useful while classifying the color of the hand is not.

The following description applies to two parts of the implementation process. The first part being the classification of the deltas in order to qualify the confidence that the gesture is being made by the user and not an intruder. In this part we use the deltas as being the feature values. The second part relating to the detection of an object within an image. In a preferred embodiment, the object may be the hand. In this case, the feature points will be extracted from the difference between an ideal object (e.g. an ideal hand) and a portion of the image received from the camera 308. It is to be noted that the second part is used to detect a hand in an image and subsequently extract the gesture made by the user from the succession of multiple images. The gesture detected using the second part is then used to extract the deltas (as discussed above) with respect to the trajectory analyzer 312. Wherein the first will be applied on the deltas produced by the first part.

In order to teach the detector how a hand may look like, and the difference between a hand and other objects in the universe, the ideal method to detect would be to feed all images in the universe showing a hand and all images in the universe not showing a hand to the detector in order to inform the detector of the differences and similarities between the submitted sample and the rest of world without a hand. If that was possible we would be sure and certain to find the image of any hand of any individual in such database. In such database the radius of exploration to find the sample is zero because the sample is there. The method would be of a deterministic nature. However, in reality, there is no method of direct access to this hypothetical infinite bank space and the decision need to be taken using a far more limited subset to get a discrete and decent count of data for the bank. The amount of samples also need to be compatible with the processing power available for the apparatus.

This involves a limited set of images used as references. This limited set of images represents one draw from an infinite set of images from the universe. Accordingly, the method of detecting an image is of a probabilistic nature (rather than a deterministic nature).

In this case, there is a need for radius of exploration of a certain size around the sample in order to have a chance of finding the submitted hand using samples from the draw. The challenge is then to find a good enough metering method to convert the bank of reference images to a database of values, and have a sufficient amount of samples in the database such that the volume defined by the radius may include a sufficient amount of samples for discrimination.

In this hypothetical infinite bank of sampled images based on the sampling method, a good metering method will create an attractor for the subject to recognize, around which all the images of similar aspect will group allowing an easier determination of the class that the object belongs to. For example, a naive metering method going from pixels to a single value may include a blunt subtraction of a submitted image containing a hand to a reference image of a hand, then summing all normed differences, to deliver a single outcome, this can be expected to show a smaller value when applied to images containing another hand than to an image containing a car.

The embodiments aim first at establishing the best possible transformation from the real image space (reality) to the smallest possible number of values, where the transformation is expected to keep most or at least sufficient amount of the characteristics of the original image to allow discrimination of the subject versus all other images. The discrimination process then uses a reference set including a subset of the limited bank of images. Then the classification within this space of small number of values becomes easier, aiming at delivering a revealing single final outcome that the submitted Image contains a hand. As this bank is just one 'draw' of the infinite reality, any evaluation of similarity to this limited subset is of a probability nature. It involves an unknown and incomputable probability that the draw represent the reality.

But if the draw is representative enough and the transformation is carrying enough of the characteristics of the object to classify, then the results of the transformation of a sampled image can be consistently compared to the draw set or between them or to a model, delivering a probability like outcome. Therefore if the subset is well chosen, the probability that the draw is representative of the hands in the world would be very high and the outcome of the detector will carry on this high probability. Even if the relevancy of the draw to universe cannot be known, the more "Yes" samples (image that belong to the class) and the more "No" samples (images without member of the class) are used, the more the bank will converge to this hypothetical value. In other words, the more relevant samples we have in the database the more accurate the results would be.

This model allows for measuring the consistency of the chosen bank of images in the lab as test and feedback allow for a trial/error experiments to see when convergence reach an acceptable level when testing a probe set of hands. The learning bank may still benefit from an increase in samples, either satisfactorily if using a specific image like an exact hand of the user, or the user's living room or office as backgrounds. It does appear that a bank a 10000 images is sufficient to create the learning database.

In an embodiment, the ratio of similarity between a submitted sample and hand is computed by counting all the Yes samples and the No samples in the vicinity of the submitted sample in the database. Subsequently, this ratio is divided by the same ratio of samples but using all samples from the database in order to produce the ratio of final similarity.

It must be noted that Images are sampled and digitized in sensors (embedded in the image capturing device 308) where the sub-transformation from reality to a discrete space of pixels of discrete value happens. Sampling an image is a part of this transformation and is generally not under the control of the apparatus.

This transformation is expected to be consistent enough (reproducible) and the art is then restricted to the handling of a set of N-tuplet sampling values (set of pixels of an Image). The associated bank of discrete values will be hereinafter referred to as database e.g. database 316 or database stored in the server 318. In the following discussion, the size of the digitized subset is said to be of an N dimension where N is for example=640*480 pixels.

On a sample set of a defined dimension N, (a N-tuplet) then transformed to a system of values (a coordinates system) of P values (a P-tuplet), the confidence of similarity is correlated to the density of similar samples within the vicinity of the sample submitted once transformed from a N-tuplet to a P-tuplet. Accordingly, in the database of a coordinate system of P dimension using a transformation, the best similarity result should aggregate around a volume of choice, also called vicinity of the sample. The size of the vicinity is a trade-off between being too small then missing valid hand and being too big then allowing artifact to be detected as hands. The way this size is chosen is explained below.

The restriction of definition of the detection as generalized above can be summarized mathematically as to find a transformation from $\mathbb{R}^N \to \mathbb{R}^P$ where N is typically the dimension of images in pixels, and P being another space typically of smaller dimension where the handling of the N-tuplet data set from $\mathbb{R}^N$ is expected to be far easier than in $\mathbb{R}^N$ itself.

This is the essence of classification in the art of Image detection. The challenge is then is to find an appropriate transform $f_k \mathbb{R}^N \to \mathbb{R}^P$ that keeps as much as possible of the features of interest of the N-tuplet from $\mathbb{R}^N$ (the Images data set of pixels) to a P-tuplet from $\mathbb{R}^P$ for easier handling.

Accordingly, the embodiments attempt to find a reduction function $f_k$ which allows reducing the number of dimensions from N to P, where P is not more than a couple of dozens (in a non-limiting example of implementation). The subjective capability of $f_k$ allows for feeding the detector with images of various dimensions without decimating information as it could happen for example if normalized with a zoom to a standardized dimension required by some other image detector. Otherwise said The function $f_k$ may be such that different N values can inject in a single value P to allow comparison of N-tuplet of different N dimensions to the same database of P dimensions. It is of interest to consider a small enough P and a function that allow the P values to be used as a coordinates system so that the database of learned samples can be seen as a multidimensional space (P) and the probed sample will be at specific coordinates surrounded by learned known samples so that they can easily be enumerated.

An example is provided below:
if the N-tuplets are delta values as determined trajectory analysis then N is variable and is the count of supplied position before a detection of an angle in the trajectory;
if the N-tuplets are images (as to decode a hand as another usage of this classification method but adapted for image) then N is also variable depends upon the sensors dimension as well as depends upon the images used for the bank which can be for example 1920×1080 as well as 640×480 for video or even other size if pictures. The embodiment used a bank of image that are in the range of 4000×4000 to 320×240.

The intent of this approach is to avoid establishing an early "averaging" in the detection process. Otherwise said, the benefits allow all samples to be considered without precluding any particular level of interest. This also allows many transformations $f_k$ to be used, and even allows dynamical adaptations of them.

In the authentication system 302 $f_k$ is the conversion from samples to Deltas, done in module 312. In the image analyzer 310 $f_k$ are a composition of steps of image processing then comparison done with modules 342, 361, and 362 that deliver expected speed performance while preserving hands characteristics and is described below.

Classification of Deltas

In an embodiment, the set of "no" samples is established from a population of humans that generate gestures. The generated gestures are then classified following cardinal directions exemplified in FIG. 2. This qualifies the differences between humans performing the same gesture in certain directions.

In this case, the volume of enumeration is typically determined using the average density, but space partitioning method as well as empirical lab method can also be used with good success for determining the best size for this volume to have a sufficient discrimination. Once the ratio of YES/NO is computed it is then related to the total database by the way of a function like a simple ratio division to establish how pertinent is the "Yes" found in the enumeration.

The timestamp may also be used to determine the speed of the movement, in order to eliminate gestures that are too fast or too slow. as determined from the user learning phase as an average+a tolerance. This can be used simply as a threshold where speed need to stay within limits for each gesture.

In the preferred embodiment, time is used as a factor for establishing the average movement duration so that once the expected duration is expired, the segments made after the time expires are not considered, whereby the comparison made along a certain dimension may fail simply by avoiding any comparison to be done for the missing segment. The result would be a drastic change of the deltas which defacto will disqualify the segment as being done by the user because the deltas will not be close to the cluster of good values (YES samples) determined during the learning phase by the user. In another embodiment, the segments received after the time expires may be implemented as another entry in the authentication module 314, (the database) and will also result in disqualifying the segments because they will be compared to different segments. In an embodiment, both methods may also be used in combination in order to take the time into consideration when authenticating a user.

In an embodiment, the repeatability indicator is expressed as the average of the density of "yes" sample for a segment, but other rules may also be implemented.

The uniqueness factor is expressed from the density of "no" sample of a volume centered on the highest density of "Yes" samples. Otherwise said, even if the density of "yes" is high, if density of "no" (non user) is high as well the uniqueness is qualified as low. This happens with easy movements like a horizontal line.

In an embodiment, the confidence factor is directly derived from the ratio of YES/No from the box evaluator divided by the overall ratio "yes"/"no" of the database.

For example a human arm can perform a horizontal drawing more easily than a vertical drawing (less usage of joints). In an embodiment, the space of probable "No" samples is filled up with a syntheses of known segments from a population of non-users. This avoids asking a population of non-user to do the gesture chosen by user for comparison. Then this coordinates is considered as the center of a box where an enumeration process occurs for "YES" versus" "No". In an embodiment, the volume of this box is related to a computation of average density from "Yes" once the learning phase is done. During this phase the signature is acquired and its fundamental characteristics are stored for later recognition. During this phase also, the repeatability factor is asserted.

Learning Phase

Figure 6:
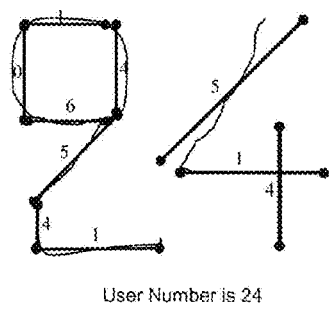
FIG. 6 illustrates an example of a key-code which corresponds to a trajectory following the path of a number (e.g. 24)

The main purpose of this phase is to acquire a user-defined key code and characterize a uniqueness factor and a repeatability factor. In a non-limiting example of implementation, the authentication system may output a key code composed of a variable number of digits representing a chosen number as in FIG. 6. FIG. 6 illustrates an example of a key-code which corresponds to a number (e.g. 24) whereby, each character of the chosen number may be handwritten sequentially with the finger on a touchpad or drawn in front of the camera. The gesture may then be recognized and its features are analyzed. In the present embodiment, the authentication system may either output the key-code associated with the number e.g. 24 or may construct the number from the key-code and send it to the system 304 for verification.

Figure 7:
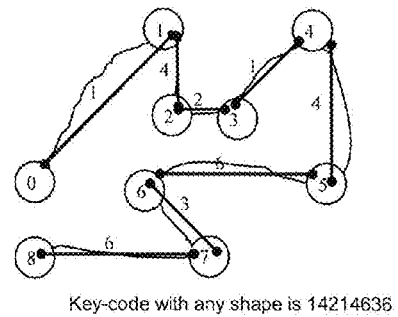
FIG. 7 illustrates an example of a key-code which represents an arbitrary shape.

In another non-limiting example, the gesture may define any shape as exemplified in FIG. 7. FIG. 7 illustrates an example of a key-code which represents an arbitrary shape. During the learning phase, the gesture may be compared to another one stored in the database. If the gesture is not unique, or too similar to another one stored in the database, the system may recommend that the user redraws the same signature and adds to it, or that the user produces a new independent signature. This may be repeated until the signature is accepted by the system. After acceptance, the system may require the users to repeat the signature for a number of times e.g. 4 more times in order to extract and store the features providing uniqueness and repeatability indicators.

Authentication Phase

During authentication, the user may perform the gesture. The detected gesture (received via a touchpad or camera) is transformed by the authentication system 302 into a key-code and a probability is associated with the gesture based on the samples pre-stored in the database for the user and for other people, as discussed above. The system 304 receives the key code and compares it to a pre-stored key-code to take an authentication based on the comparison and the probability.

Even if valid, the key-code can still be rejected on the basis of confidence if the probability is lower than a predetermined threshold. This greatly increases robustness of authentication against hacking attack.

In an embodiment, the code does not dependent on the orientation of the camera/touch sensitive surface.

Database Updating

In an embodiment, the database of learned user input can be regularly updated with new drawn gestures For all non-rejected gestures, signature features are all stored in the device and when connecting to the central server, they contribute to the updating of the database. In another embodiment, this may also contribute to refining the features of the signature as the user will regularly improve their movements with time decreasing the standard deviation of their signature features and then improving the performance indicators. In an embodiment, when connecting to the central server, the server may return two updated uniqueness and repeatability indicators.

The database of learned images, can also benefit form an connection for updating (increasing number of "yes" and "no" sample) and can be regularly updated with new images of know hand as well as images of various non-hand, like background of living room or offices or street. It must be noted that the relevant information is the 21 values out of the matching process, hence there no need to get the original image but just his signature, which preserve the confidentiality of the images if applicable.

Lost Gesture Phase

It is possible that a user may lose/forget their gesture. A restoring procedure may allow the user to restore their signature. In an embodiment, this may be done based on a preliminary acquisition process consisting for the user in drawing some geometrical figures that are proposed by the system. For security reasons as well as user confidence in the tools it can very well be that the key-code corresponding to the gesture itself is never stored, so the intent is not to restore or show the gesture but to allow a process that can be far more tedious and laborious but allows for an unlocking situation. The system may also store the related drawing features and ask the user to draw again these figures for restoring. If the drawings match what is stored for the user on the system, the system may allow the user to restore their signature by producing it again. In an embodiment, the system may erase the previous signatures when registering new ones.

Operational Improvement:

In the preferred embodiment the process is standalone using an extraction of the database for cluster analysis, but in a second embodiment the process uses online connection to increase the uniqueness analysis, as well as allowing safer usage by centralizing storage of decoding information. It must be noted that if the method transmits the database of samples, this information does not need to be encrypted as no eavesdropped would allow to know which cluster are of preference for the gesture used by user. Like sending a translation dictionary is of no use if the original text is unknown.

In a fourth embodiment an improvement of the method of features extraction consists in processing a wavelet transform of each curve in the referential of to the segment following the linear regression step of FIG. 5*a* & 5*b*.

In a fifth embodiment is the appliance of the method with a camera device connected to a Media center or a computer, also consisting in code gesture authentication. While sending a code to control some features like channel selection or sound modification, the code gesture is authenticated but also its features in order to authorize or not the operator to control the device. However, the gesture has to be continuous from a starting-point up to an ending-point, contrarily to the touch screen case, where you can push and release finger several times to enter the code.

Considering that the movement has to be continuous from the starting-point to the ending-point, the acquisition mode is also suitable with the cardinal based vectors method.

Image Detection

Figure 8:
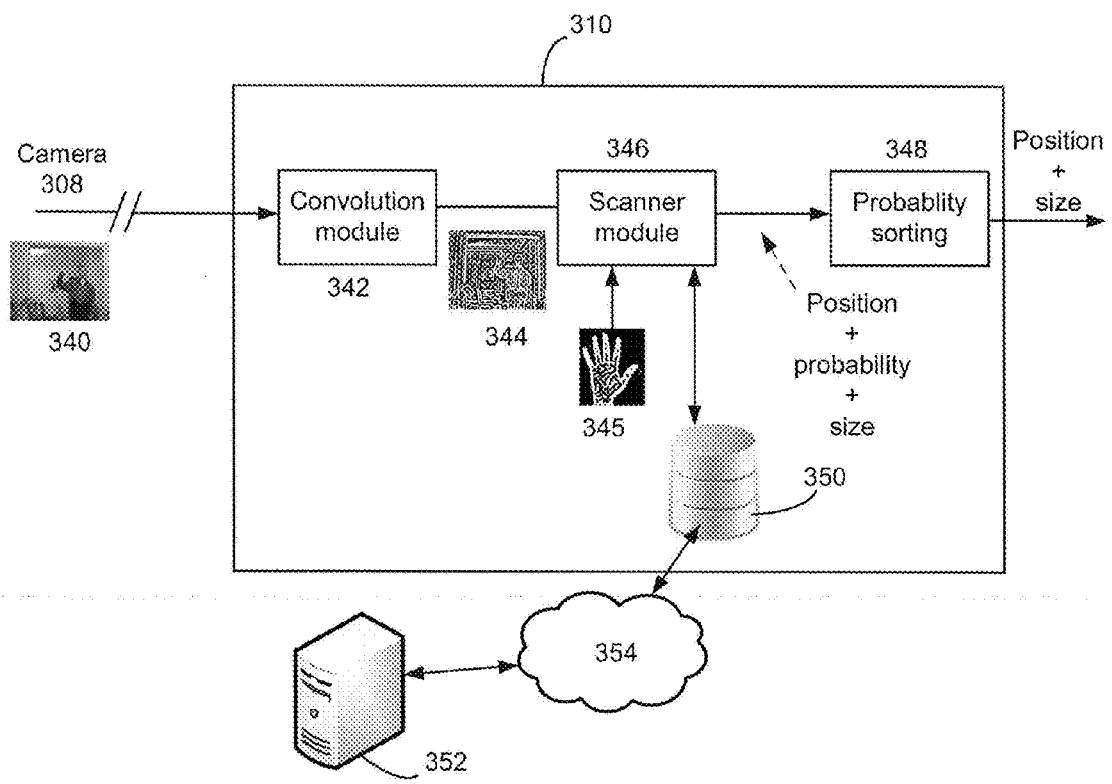
FIG. 8 illustrates an embodiment of the image analyzer used for detecting the object (hand) in an image and delivering the position and size of the hand in the image.

FIG. 8 illustrates an embodiment of the image analyzer 310 used for detecting the object (hand) in an image and delivering the position and size of the hand in the image.

As shown in FIG. 8, the camera 308 outputs a stream of images 340. The image analyzer 310 comprises a convolution module 342 adapted to process the images 340 received from the camera 308 to enhance peculiarities of the image such as edges and for making the image in a binary form allowing fast comparison between the images 340 and an ideal image stored in memory which has also been processed in the same manner. The binary version 344 of the image 340 is sent to a scanner module 346 for search and evaluation. The scanner module 346 receives as inputs a convoluted version (binary version) of an ideal hand 345 (which is preliminary processed using the process 342), and a convoluted version 344 of the image 340 received from the camera 308 and outputs the highest probability of the presence of a hand in the image 344, the size and the position of the hand. In other words, the scanner module 346 outputs the highest probability that a hand is found in the image 344, where the hand was found, and its size. In an embodiment, the scanner module may have access to a local database 350 and/or a remote database/server 352 via a telecommunications network 354 for obtaining reference samples used for computation as will be described hereinbelow.

In an embodiment, the scanner module 346 is connected to a probability sorting module 348 which is adapted to eliminate probabilities that are below a predefined threshold. The probability sorting module may also be responsible for eliminating probabilities of hands based on criteria that involve inconsistencies of candidates across frames.

Accordingly, the image analyzer outputs the size and position of the hand within the images received from the camera 308.

Figure 9:
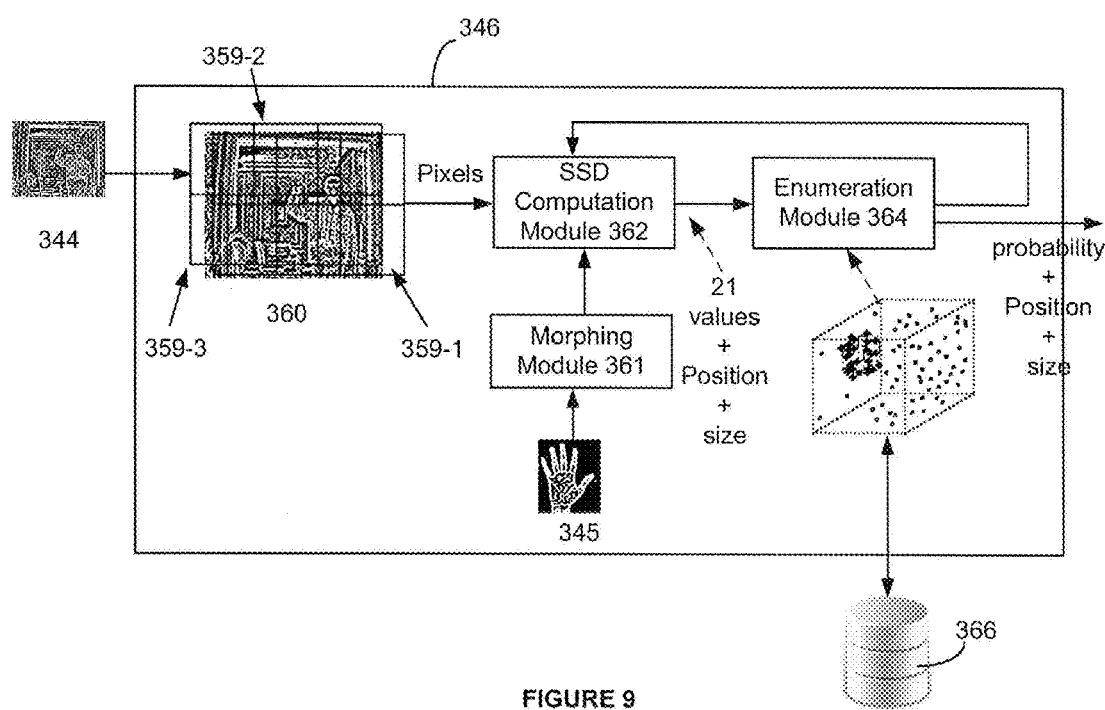
FIG. 9 illustrates a non limiting example of a block diagram of a scanner module in accordance with an embodiment.

FIG. 9 illustrates a non limiting example of a block diagram of a scanner module in accordance with an embodiment. As shown in FIG. 9, the scanner module 348 receives the binary image 344 and subdivides it into a plurality of areas 359 (e.g. rectangles) of various sizes as shown at 360. The size of the rectangle depends on the size of the image of ideal hand 345 once morphed. Each one of the areas is scanned in order to evaluate the probability of the presence of the object (hand) in it.

In an embodiment, the search is done using steps of four pixels repeated over the entire candidate image (the embodiments are not limited to four pixels, and may be implemented with different numbers of pixels depending on the size of the area 359 and the resolution of the image). In other words, the area of search is moved by four pixels at each iteration. Whereby adjacent areas 359 may have overlapping pixels. The intent of this method is to find the best match that leads to the lowest Sum or Square Difference (SSD) values.

For example, if the image size is as follows: 1024 pixels*1024 pixels, the resolution may be lowered by a factor of four thus obtaining an image of 256 pixels*256 pixels. With a stepping rate of 4 pixels this leads to a (256/4)* (256/4) =4096 areas of interest (rectangles). Pixels of each area of the 4096 rectangles are fed to an SSD computation module 362 which is adapted to evaluate the difference between each rectangle and many morphed (distorted) versions of the ideal image of the hand 345 produced using a morphing module 361.

The number of distorted versions used each cycle may be in the range of 1000 representing various scaling and rotations of the hand 345 in order to maximize the chance of finding a decent match in the image 340, otherwise said in order to get a better representative SSD (of a low value then) many attempts are made to see if an adapted version of the tile doesn't exhibit naturally a certain level of similarity. For example, the morphing module may apply one or more combinations of: + to −10 degrees rotations by increments of 2 degrees for each rotation, 20 scaling levels, five x-y distortions for each scaling level etc.

Referring back to the SSD computation module 362, this module performs the sum of the square of the difference between pixels of each of the morphed versions 345 and each rectangle 359 in the binary image 360. The SSD module 362 is adapted to find the best match from all the morphed versions tried on each rectangle 359. This best match search must only be seen as an implementation tradeoff allowing to decrease the probability evaluation step of "yes"/"no" volume, which otherwise can be done for every morphed version. Using theses best match try of morphed version it only submit a reduced set as the most locally relevant similarities. In an embodiment, the comparison process for each image 360 is divided into 21 comparisons performed in pyramidal manner as will described herein below. It should be noted that the number 21 in this context is only an implementation decision. However, the embodiments are not limited to such constraint.

In an embodiment, the SSD computation module 362 performs the comparison in a loop whereby the rectangle is compared to each morphed version of the image 345, in order to choose the lowest 21 SSD values. It should be understood that the 21 values are considered as a set. This process is repeated to find the lowest 21 values for each rectangle 359. The number of comparisons made for each image reaches approximately 4 millions.

In an embodiment, the parameters used to morph the image 345 which lead the lowest 21 values are kept for use in determining the final computation, position, and size of the hand.

Referring back to the SSD computation module 362, this module 362 outputs the 21 best match values (lowest values) for each rectangle 359 in the image 360. In the present example, selection of the number of values is described herein below.

The SSD computation module 362 outputs the 21 values but carry also the position and size of the hand. The enumeration module 364 weight the 21 values and deliver a probability that the 21 values represent a hand based upon the reference samples provided in the database 366. The database 366 may be a local database and may also be fed/updated by a remote server over a telecommunications network.

Figure 14A:
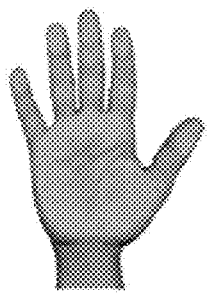
FIGS. 14a to 14e illustrate examples of images that may be processed and used as samples in the multidimensional space.
Figure 14B:
Figure 14C:
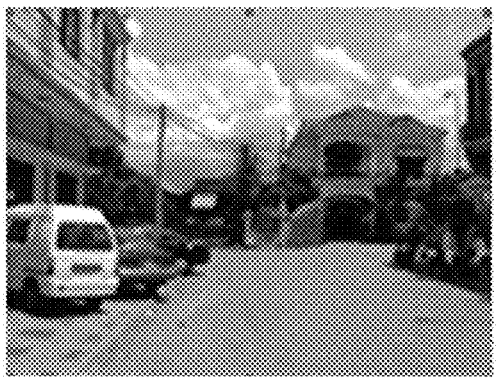
Figure 14D:
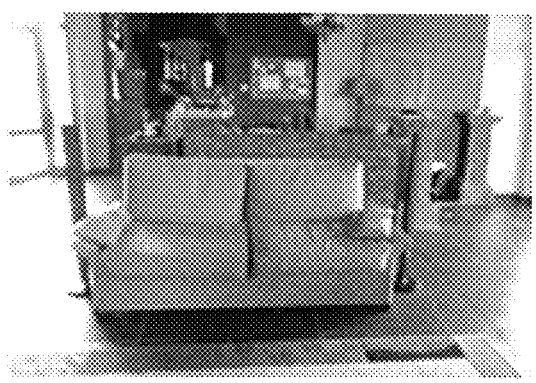
Figure 14E:
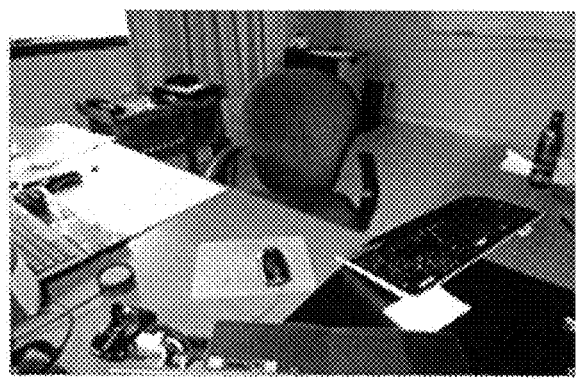

Inside the enumeration module, the 21 values are used as coordinates in 21 dimensional space. The 21 dimensional space contains the 21 values (coordinates) preloaded in the database 366. Each set of 21 values represent the output of SSD computation module 362 applied on images received from an image bank (not shown). The bank of images stores images that include hands and only hands (as exemplified in FIGS. 14*a* and 14*b*), and images that do not contain hands (as exemplified in FIGS. 14*c* to 14*e*). The set of 21 values associated with images that include only hands are considered as YES samples (or match samples) in the multidimensional space, while the 21 values associated with images that do not contain hands are considered as "No" Samples.

By essence, when images that include a hand are compared to the image of the ideal hand 345 the set of 21 values which are the outcome of the SSD computation module 362 for these images will be similar and probably low. By contrast, when image not including hands are compared to the image of the ideal hand 345, the set of 21 values which are the outcome of the SSD computation module 362 will not be similar and probably high at least for a few of them (along few of the dimensions).

The 21 values represent the coordinates of points in the 21 dimensional space. Accordingly, the sets of 21 values associated with images that have hands include coordinates that will cluster in the 21 dimensional space and should be closer to zero. By contrast, the sets of 21 values associated with images that do not have hands include coordinates that will disperse in the 21 dimensional space. An example is provided below with respect to FIGS. 10*a* and 10*b*.

Figure 10A:
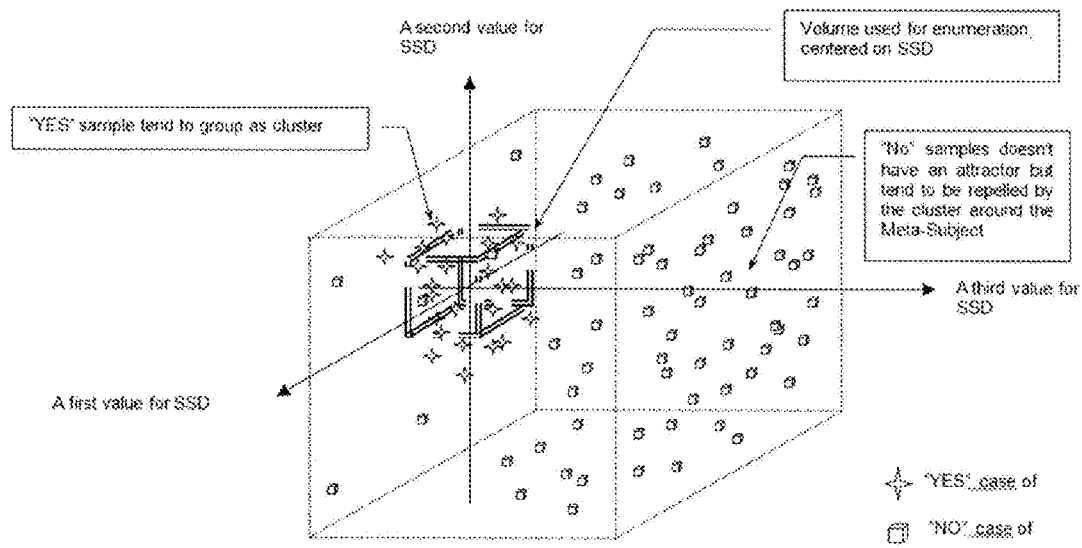
FIG. 10a illustrates an exemplary three dimensional space including a plurality of reference samples including Yes samples and No samples.

FIG. 10*a* illustrates an exemplary three dimensional space including a plurality of reference samples of images representing hands which are considered as the "Yes" samples, and images not containing hands which are considered as the "No" samples. As shown in FIG. 10*a*, the Yes samples form a cluster while the No samples disperse in the space. It should be noted that FIG. 10*a* is only a hypothetical example in three dimensions which is only intended for illustration purposes while the real embodiment is implemented using 21 dimensions (which cannot be illustrated to humans, but can be implemented in machines because an additional dimension for a machine means simply an additional index).

Figure 10B:
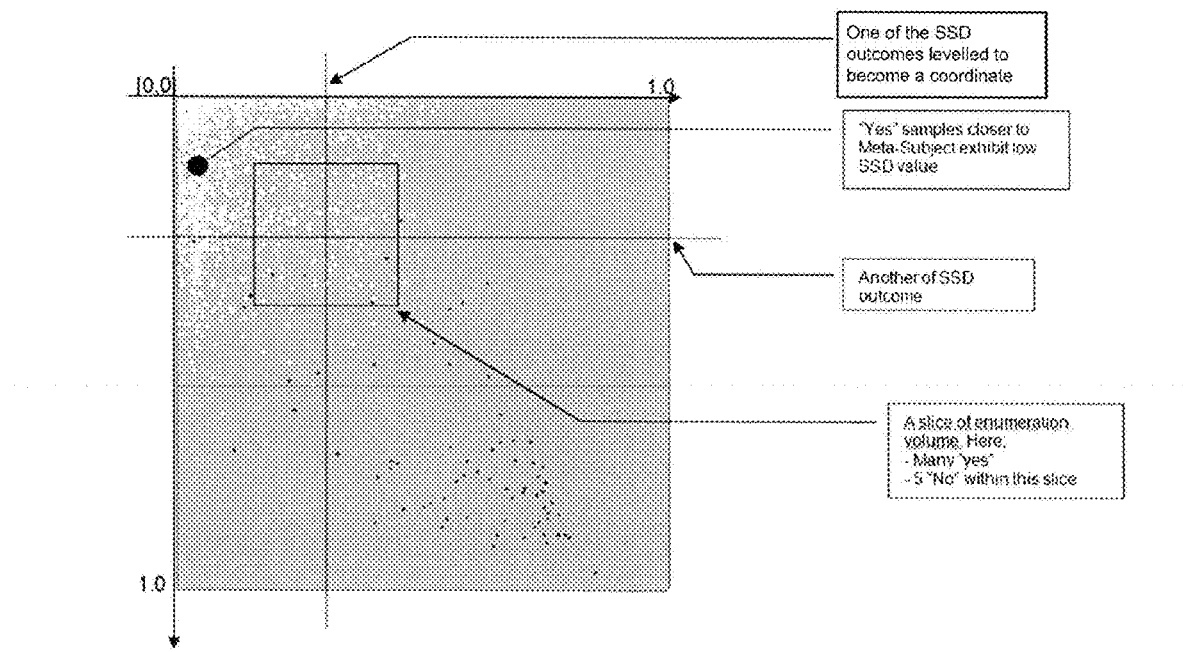
FIG. 10b illustrates a two-dimensional illustration of the multi-dimensional space representing a slice along two dimensions.

FIG. 10*b* illustrates a two-dimensional illustration of the 21 dimensional space representing a slice along two dimensions. In FIG. 10*b*, the white dots represent coordinates associates with Yes samples, while the black dots represent coordinates of No samples. As illustrated in FIG. 10*b*, the black dots tend to high and random values within the space, and this is due to the high difference they have with the ideal image of a hand.

In an embodiment, the enumeration module 364 applies for each rectangle 359 the 21 values output by the SSD computation module 362 in order to determine a probability that the rectangle being examined shows a hand. In one embodiment, the enumeration module counts the YES and NO samples around that point within a volume of a reasonable size, and divides the number of Yes samples by the number of No samples to obtain a ratio of YES versus No samples within the volume. This ratio is then divided by the ratio of Yes samples versus No samples in the entire database (space). The resulting number represents the probability that the rectangle in question contains a hand. Accordingly, the more samples there is in the database the more accurate the results will be. In an embodiment, a surface interpolation method may be used to synthesise "yes and "no" samples in an area of the space having a poor density of samples in order to avoid computational error or wrong rounding.

The size of the reasonable volume around a certain sample may be defined in a variety of methods. In one method, the size is related to the density of the database such that the volume must contain a certain percentage of the entire count of samples in the database. In another embodiment, the size of the reasonable size may be related to size of the smallest volume that may be found in the space which includes a specific set of samples representing hands. In another embodiment, the size may be dynamically sized (variable) along one of more of the dimensions until one of the above criteria is met. Other methods may also be used without departing from the scope of the embodiments.

Referring back to the enumeration module 364, this module performs the processing in a loop on all the areas (as they shift by four pixels as described above), until the entire image is scanned.

Choice of 21 Values (Pyramid Comparison)

As discussed above, the SSD module 362 performs a sum of square difference of pixels between each of the morphed versions 345 of the ideal hand and each rectangle 359 in the binary image 360. In a non-limiting example of implementation, the comparison process for each image 360 comprises 21 comparisons performed in pyramidal manner, whereby different morphed versions of the ideal hand are compared to each rectangle 359.

Figure 11:
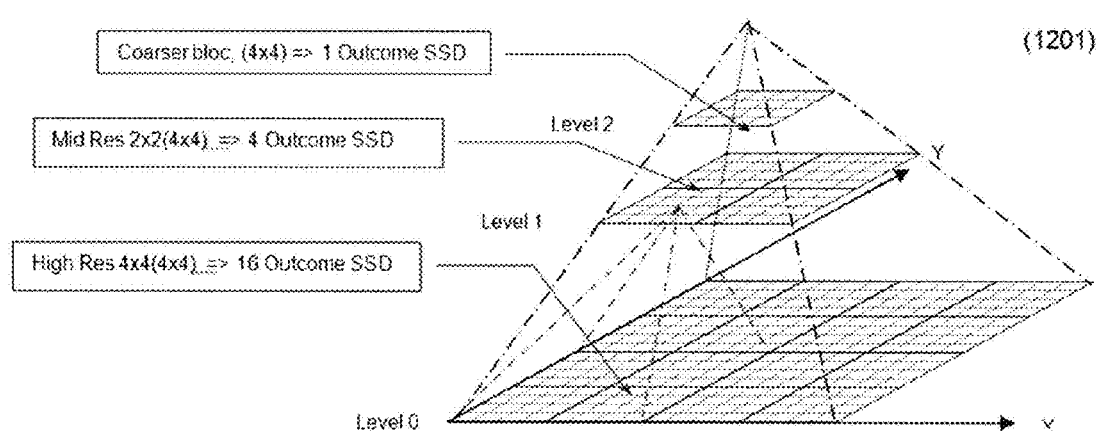
FIG. 11 illustrates a pyramid including three resolution levels for the image of the ideal hand.

FIG. 11 illustrates a pyramid including three resolution levels for the image 345 of the ideal hand. A level 0 which has the highest resolution and includes 16 tiles, a level 1 which has a medium resolution and includes four tiles, and a level 2 level which has the lowest resolution and includes a single tile. In an embodiment, the scan begins with the level 2 image (image of the entire hand in a single tile) to perform one comparison, then proceeds to the level 1 to perform 4 comparisons e.g. comparing each of the four tiles of the image to the rectangle 359 in question, then proceeds to the level 0 image to perform 16 comparisons, thus resulting in 21 comparisons. The 21 comparisons provide a set of 21 values associated with each rectangle 359. The 21 values are the coordinates of the sample point representing the rectangle in a 21 dimensional space.

The progressive comparison from coarse resolution (level 2) to finest resolution (level 0) allows increasing speed and efficiency giving the opportunities of using guidelines for the search of lower tiles. For example, the centre of tile of a lower level is constrained to stay within the proper quadrant of their respective tiles of higher level.

The decision to first try a best match approach for each are of interest and then to submit the outcome to the enumeration module 364 is an implementation decision. The search for a best match before submission can be remove entirely and the 21 values outcome from every set of morphed version tried on every area of interest (359) (in the range of millions) can be submitted to the enumeration volume to deliver a probability with good quality that the hand exists.

As the principle within the enumeration module deliver a probability, aggregation of outcome can be made using many probability laws, like Bayesian laws. Then, the enumeration module can be tailored to process one dimension at time, then the Best SSD value is the best in the sense of individual dimension and doesn't need any form of aggregation of SSD, the aggregation then rely on of the 21 probabilities outcome of each single dimension enumeration volume. The preferred embodiment use this approach.

Multiplicity of Meta Subjects

Figure 12A:
FIG. 12a illustrates an example of an image including two meta-subjects for detection by the image analyser.

In an embodiment, the image analyzer 510 may be configured to detect more than one searched object (meta-subject). For example, a hand and head as exemplified in FIG. 12*a*. The present embodiment may be configured in different manners. For example, in one embodiment, one of the meta-objects may be considered as the main meta-subject e.g. the hand without which the probability would be a zero, while presence of the other meta-subject head may be a confirmation that increases the probability associated with the main meta-subject, and absence of the second meta-subject may have little or no effect on the probability of the main meta subject. In another embodiment, the two probabilities may be averaged together $P=(Pa+Pb)/2$ to produce an overall probability which is sent to the probability sorting module 348.

It is to be noted that in the case where more than one meta-subject is used, it is important to use different databases in the learning phase. For example, a database that includes images of only hands and images showing no hands, and another database having images of only heads and images showing no heads.

In an embodiment, the outcome of each database is a contributing probability so that the learning phase should be done for both databases simultaneously, even if the learning image contains a hand (the main Meta-subject) but not a head (the ancillary meta-subject).

Figure 12B:
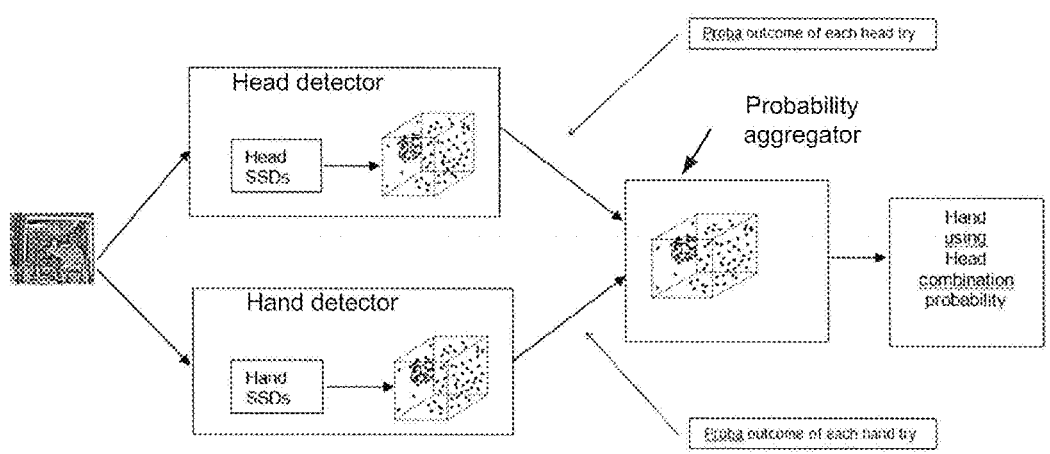
FIG. 12b illustrates a non-limiting implementation of determining a joint probability for two meta-subjects.

In an embodiment, the same enumeration process discussed above is applied to detect the presence of hands and heads and the probabilities output by each enumeration module may be entered into a third database whereby the same process is applied a third time to determine an overall probability for the head and the hand, as exemplified in FIG. 12*b*.

Authentication Module

Referring back to FIG. 1*a*, the trajectory analyzer is connected to the authentication module 314 and provides the latter with a stream of values representing the four deltas (81, 82, 83, 84) for each segment and the direction in which the segment is moving. In an embodiment, the direction is represented by an integer of 0 to 7 following the cardinal directions shown in FIG. 2.

Figure 13:
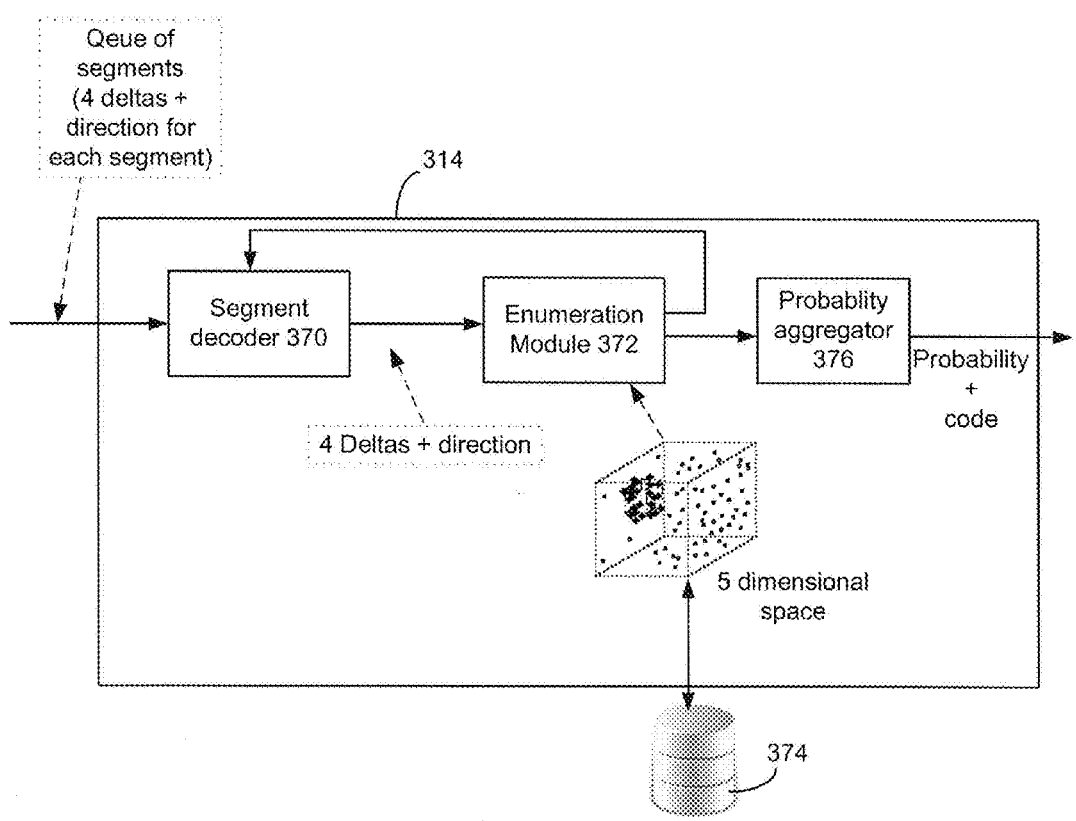
FIG. 13 is a block diagram of an exemplary authentication module, in accordance with an embodiment.

FIG. 13 is a block diagram of an exemplary authentication module 314, It should also be noted that the enumeration module 314 may perform the same analysis in a multi-dimensional space having a number of dimensions that corresponds to the number of deltas ($\delta 1, \delta 2, \delta 3, \delta 4$) in each set e.g. four dimensions. However, better results may be obtained if we account for the direction of the segment associated with the set of deltas being classified, in this case, an additional dimension would be added.

In accordance with an embodiment. In the example of FIG. 13, the sets are received at a segment decoder 370 which is adapted to break the values into sets of a five (4 deltas+1 direction) and pass them to an enumeration module 372 for weighting the 5 values and delivering a probability that the 5 values belong to the user based upon the reference samples provided in the database 374 (which may and may not be the same as the database 366). The database 374 may be a local database and may also be fed/updated by a remote server over a telecommunications network. It is also possible to receive the samples from a remote database over a telecommunications network as discussed earlier.

Similar to the 21 values discussed above, choice of 5 values is an implementation decision that joins between an acceptable level of accuracy and acceptable level of computation. However, the embodiments may also be implemented with a smaller or larger number of values. For example, it is possible to have two, three or five or more deltas for each segment. In a further example, it is possible to use a derivative of speed e.g. time as an additional dimension.

Inside the enumeration module, the 5 values are used as coordinates for the sample in a 5 dimensional space. The 5 dimensional space contains 5 value sets (coordinates) preloaded in the database 372. Each set of 5 values represent the four deltas for a certain segment and the direction of that segment. The set of 5 values associated with the user are considered as YES samples (or user samples) in the 5 dimensional space, while the 5 values associated with other users are considered as "No" Samples.

By essence, the different samples associated with one user represent the deviations that the user makes when drawing a certain segment along one of the cardinal directions. Accordingly, the samples associated with the user tend to cluster in the multidimensional space, defining a certain multidimensional volume in certain location within the multidimensional space. Similarly, the samples of other users tend to cluster as well. However, other users' samples cluster in different locations within the multidimensional space because different people make gestures in a different manner.

As discussed above, the 5 values represent the coordinates of a point (sample) in the 5 dimensional space. In one embodiment, the enumeration module counts the YES and NO samples around that point within a volume of a reasonable size, and divides the number of Yes samples by the number of No samples to obtain a ratio of YES versus No samples within the volume. This ratio is then divided by the ratio of Yes samples versus No samples in the entire database (space). The resulting number represents the probability that the segment in question is drawn by the user.

The size of the reasonable volume around a certain sample may be defined in a variety of methods. In one method, the size is related to the density of the database such that the volume must contain a certain percentage of the entire count of samples in the database. In another embodiment, the size of the reasonable size may be related to size of the smallest volume that may be found in the space which includes a specific set of samples representing hands. In another embodiment, the size may be dynamically sized (variable) along one of more of the dimensions until one of the above criteria is met. Other methods may also be used without departing from the scope of the embodiments.

Referring back to the enumeration module 372, this module performs the processing in a loop on all the segments decoded by the segment decoder 370.

The probability output by the enumeration module 372 is sent to a probability aggregator 376. The probability aggregator 376 receives the probabilities associated with each segment of the gesture/trajectory to generate a single probability that indicates the likelihood the gesture is performed by the authenticated user. The authentication module 314 outputs the aggregated probability along with the code represented by the gesture as exemplified in FIGS. 6 and 7.

In a less preferred embodiment, instead of classifying the 21 SSD values in a 21 dimensional space in order to determine the probability that the gesture is made by the user, it is also possible to calculate 21 probabilities, a probability for each dimension using the same principle, and then aggregate the 21 probabilities using a probability aggregator to output an aggregated probability that the image contains a hand.

In other words, the 21 dimensional matrix delivering a single probability may be replaced by 21 probabilities out of the 21 single dimension matrix. This embodiment may use an aggregation law based on the complement of the 21 products of the complements of each probability. Then, the dataset would be made of two sets of 21 values (a set for the "Yes" and a set for the "No"), where each single dimension index size can be made of a number of intervals e.g. 256 intervals. Enumeration along each dimension enumeration, may be done by taking the counts of samples within the intervals containing the submitted value.

In yet a further embodiment, it is possible to divide the 21 dimensions into groups of two or more dimensions and for each group determine the probability along the two or more dimensions. The probabilities for all the groups may then be aggregated to obtain the aggregated probability.

In an embodiment, it is possible to implement Bayes rules and/or various other methods in the probability aggregator 376 for determining the final probability (aka aggregated probability). In a preferred embodiment, it is possible to implement a complement of the product of all complements of all sub probabilities as defined in the following equation:

$$P = 1 - \prod_{i=0}^{i=n} (1 - PI_i)$$

Where $PI_i$ are the individual contributing probabilities. However, this is an implementation choice and other rules may also be used. In an embodiment, the probability aggregator 376 may implement rules that may be dynamically influenced.

Aggregated Probabilities with Multiple Meta-Subjects

When using multiple meta-subjects, it is preferable to replace these rules by rules which apply probability averaging. For example, as exemplified In FIG. 12b, the principle of combining values trough a volume of learned sample, as explained, can again be used to create another space of multiple dimensions, for example two dimensions, when dealing with two meta subjects. In which case, the learning phase creates sample points constituted of the outcomes of each individual detector (hand and Head). In other words, as shown in FIG. 12b the hand detector may output a probability that a hand exists in the image, and the head detector may output another probability that the head exists in the image. The probabilities received from the hand detector and the head detector may then be classified into a two dimensional dataset which may be used as a probability aggregator to output a combined probability for the hand based on the presence of the hand as a main meta-subject and the head as an auxiliary meta-subject.

The principle of using a dataset as coordinates then enumerating the kind of learned data around a submitted sample set can be generalized to better reflect the reality of a bank of images when needing analysis of a multiplicity of Meta-Subject. Then instead of using an arbitrary law for aggregating the outcome of two different detectors, the outcome values can be seen as two coordinates in a surface which represent the dataset. This data set being taught by submitting simultaneously the image bank to both detectors. The bank of images should includes images showing a head and a hand as well as images showing a hand but no head or partial head.

The constraint is that the learning phase should involve all the meta-subjects at same time, because individual contributing probabilities are implicitly linked. For example, in the case of a head+a hand, If the hand is of a low quality because it is far from camera, the hand contributing probability can be low, but the presence of a head is a contributing probability that will make the final determination more likely to be true. While if the hand is very close to the same camera, the quality of the hand probability will be high but very likely the head cannot be seen for being fully or in partly out of the scene. Then the head contributing probability is low. Accordingly, the learning phase will take events into consideration and the space used for merging each outcome should reflect these known samples. However combined learning is also applicable, with the addition of a constraint like the hand to be reasonably close to the head in the scene.

As discussed above, the authentication system 302 may be used for authenticating users onto the computing device on which they are implemented, and may also be used with third party systems such as banks, or financial institutions which are accessible over a network. For example, the system 302 may be used for authenticating users before finalizing a financial transaction whereby, the system 302 provides the probability that the user is who they claim, along with the code represented by their gesture. The system 302 does not have to have access to the code in order to operate. For example, if the access code is 2467, the user may draw the code on the touchpad or in front of a camera using hand gestures. In which case, the system 302 may determine based on the way the user makes the gestures the probability that the user is who they claim, and the code drawn by the user. The third party system may then verify if the code matches what they have on record for the user, and compare the probability output by the system 302 to a certain threshold in order to decide whether or not the transaction should be completed, or whether or not the user should be granted access etc.

Figure 15:
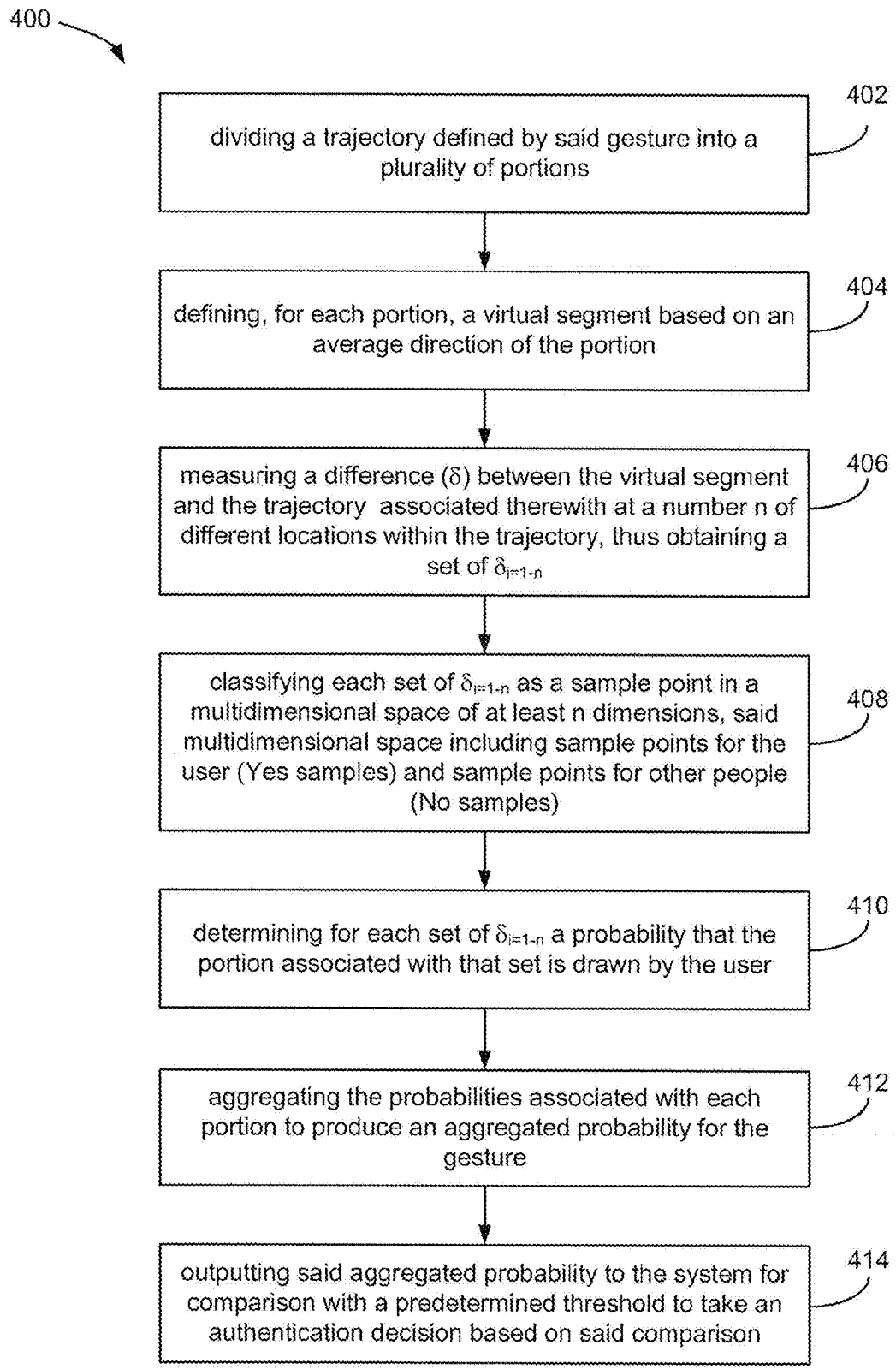
FIG. 15 is a flowchart of a computer implemented method for authenticating a user into a system using a gesture drawn by the user, in accordance with an embodiment.

FIG. 15 is a flowchart of a computer implemented method 400 for authenticating a user into a system using a gesture drawn by the user, in accordance with an embodiment. Step 402 comprises dividing a trajectory defined by said gesture into a plurality of portions. Step 404 comprises defining, for each portion, a virtual segment based on an average direction of the portion. Step 406 comprises measuring a difference ($\delta$) between the virtual segment and the trajectory associated therewith at a number n of different locations within the trajectory, thus obtaining a set of $\delta_{i=1-n}$. Step 408 comprises classifying each set of $\delta_{i=i-1}$, as a sample point in a multidimensional space of at least n dimensions, said multidimensional space including sample points for the user (Yes samples) and sample points for other people (No samples). Step 410 comprises determining for each set of $\delta_{i=1-n}$ a probability that the portion associated with that set is drawn by the user. The determining comprising counting a number of Yes samples and a number of No samples within a predefined volume around the sample point associated with the set of $\delta_{1-n}$; calculating a first ratio of Yes samples versus No samples within the predefined volume; and dividing the first ratio by a second ratio representing the number of Yes samples versus No samples in the entire multidimensional space, to produce said probability. Step 412 comprises aggregating the probabilities associated with each portion to produce an aggregated probability for the gesture. Step 414 comprises outputting said aggregated probability to the system for comparison with a predetermined threshold to take an authentication decision based on said comparison.

Figure 16:
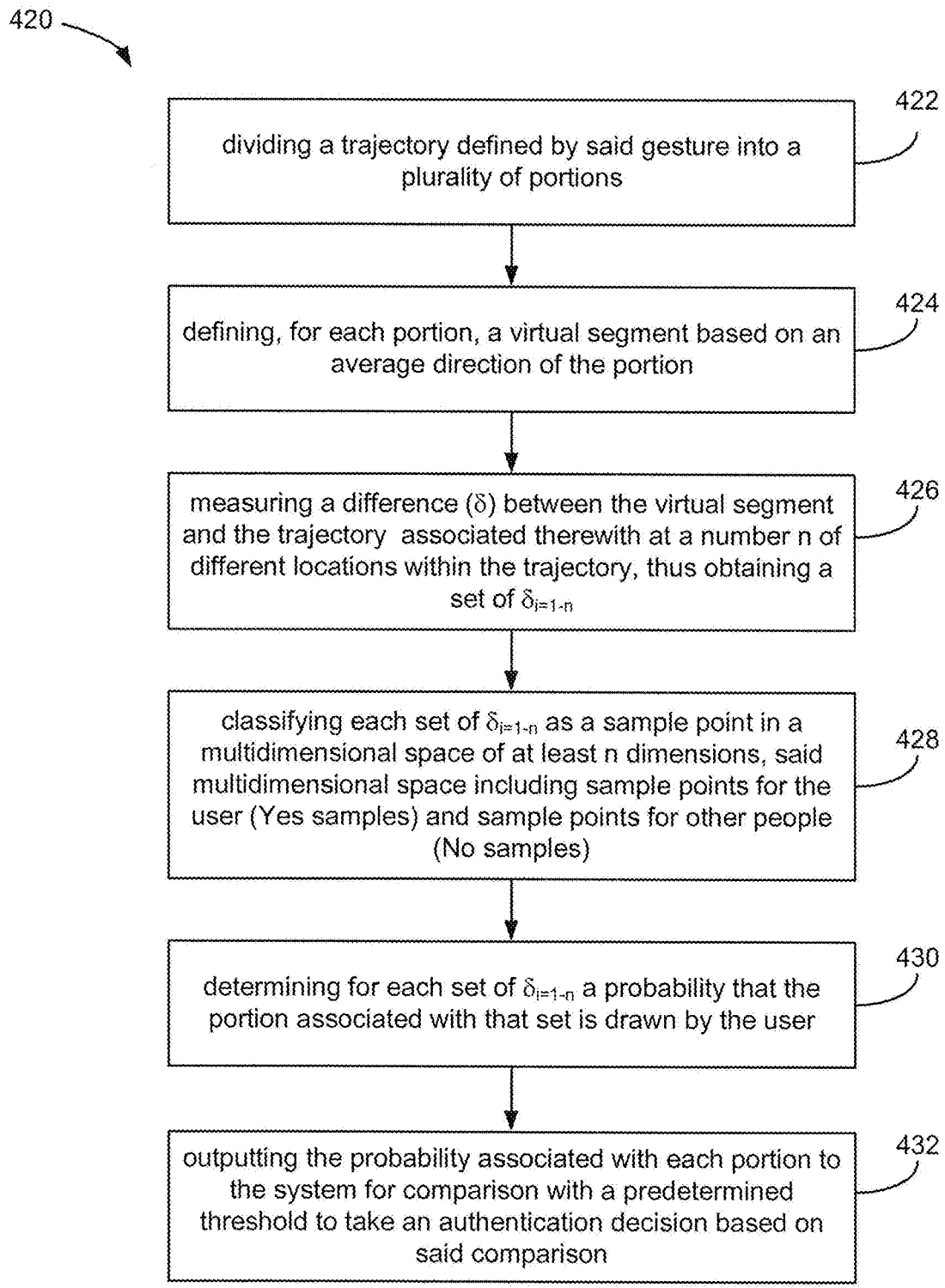
FIG. 16 is flowchart of a computer implemented method for authenticating a user into a system using a gesture drawn by the user, in accordance with another embodiment.

FIG. 16 is flowchart of a computer implemented method 420 for authenticating a user into a system using a gesture drawn by the user, in accordance with another embodiment. Step 422 comprises dividing a trajectory defined by said gesture into a plurality of portions. Step 424 comprises defining, for each portion, a virtual segment based on an average direction of the portion. Step 426 comprises measuring a difference ($\delta$) between the virtual segment and the trajectory associated therewith at a number n of different locations within the trajectory, thus obtaining a set of $\delta_{i=1-n}$. Step 428 comprises classifying each set of $\delta_{i=1-n}$ as a sample point in a multidimensional space of at least n dimensions, said multidimensional space including sample points for the user (Yes samples) and sample points for other people (No samples). Step 430 comprises determining for at least one set of $\delta_{i=1-n}$ a probability that the portion associated with that set is drawn by the user. The determining may include counting a number of Yes samples and a number of No samples within a predefined volume around the sample point associated with the set of $\delta_{1-n}$; calculating a first ratio of Yes samples versus No samples within the predefined volume; and dividing the first ratio by a second ratio representing the number of Yes samples versus No samples in the entire multidimensional space, to produce said probability. Step 432 comprises outputting the probability associated with each portion to the system for comparison with a predetermined threshold to take an authentication decision based on said comparison.

Figure 17:
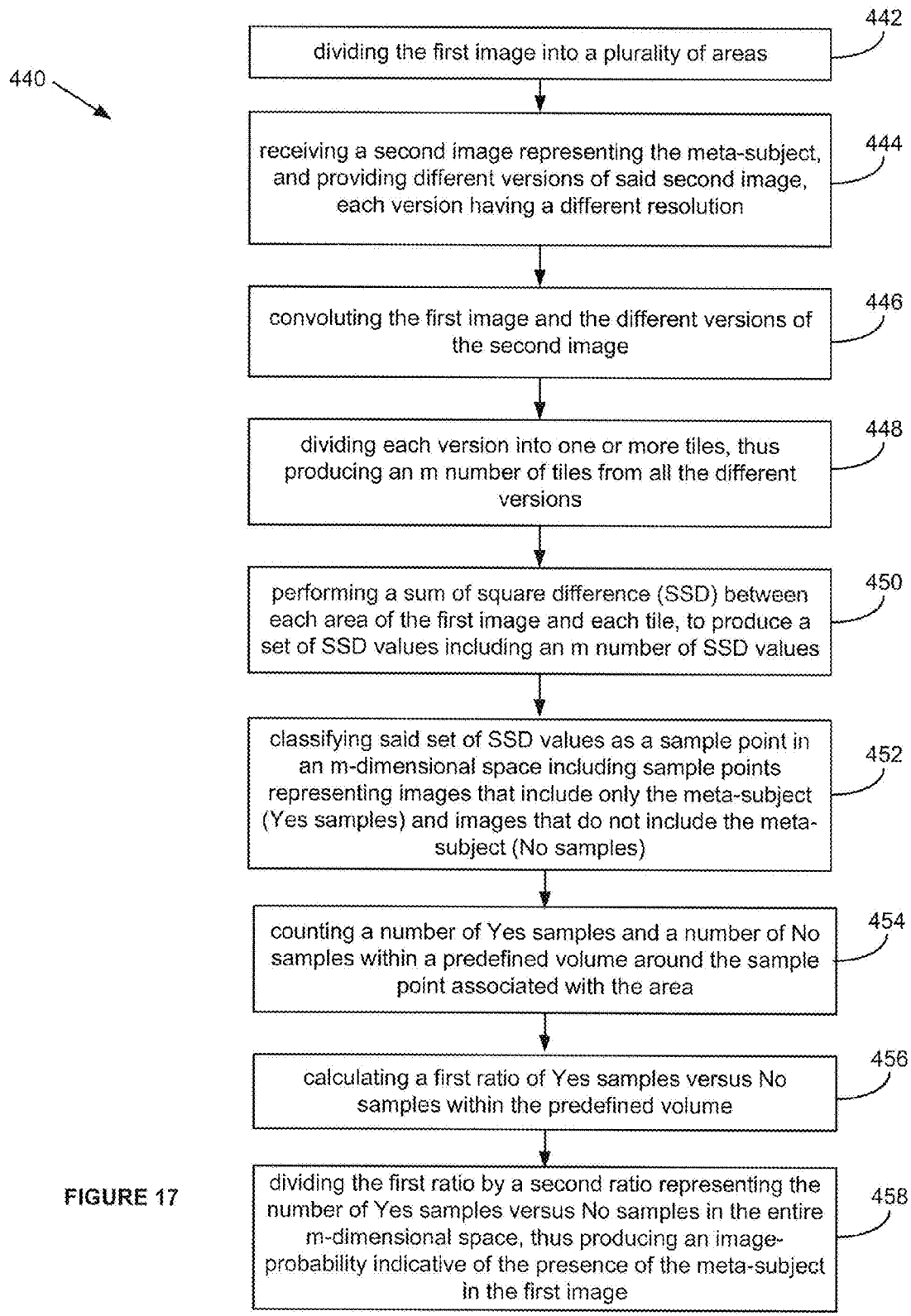
FIG. 17 is flowchart of a computer implemented method for detecting a meta-subject in a first image.

FIG. 17 is flowchart of a computer implemented method 440 for detecting a meta-subject in a first image. Step 442 comprises dividing the first image into a plurality of areas. Step 444 comprises receiving a second image representing the meta-subject, and providing different versions of said second image, each version having a different resolution. Step 446 comprises convoluting the first image and the different versions of the second image. Step 448 comprises dividing each version into one or more tiles, thus producing an m number of tiles from all the different versions. Step 450 comprises performing a sum of square difference (SSD) between each area of the first image and each tile, to produce a set of SSD values including an m number of SSD values. Step 452 comprises classifying said set of SSD values as a sample point in an m-dimensional space including sample points representing images that include only the meta-subject (Yes samples) and images that do not include the meta-subject (No samples). Step 454 comprises counting a number of Yes samples and a number of No samples within a predefined volume around the sample point associated with the area. Step 456 comprises calculating a first ratio of Yes samples versus No samples within the predefined volume. Step 458 comprises dividing the first ratio by a second ratio representing the number of Yes samples versus No samples in the entire m-dimensional space, thus producing an image-probability indicative of the presence of the meta-subject in the first image.

Figure 18:
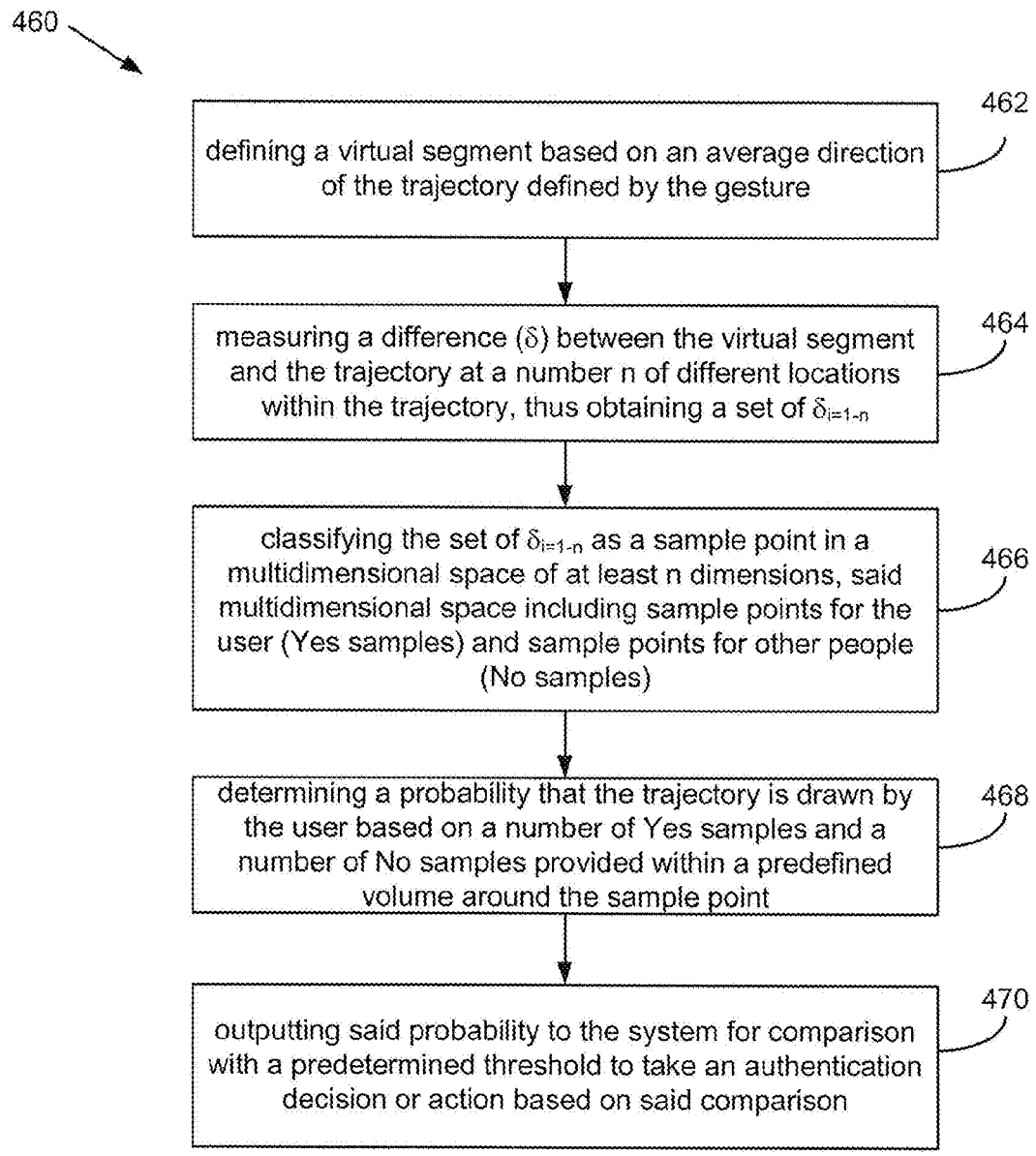
FIG. 18 is flowchart of a computer implemented method for authenticating a user into a system using a gesture drawn by the user, in accordance with a further embodiment.

FIG. 18 is a flowchart of a computer implemented method 460 for authenticating a user into a system using a gesture drawn by the user. Step 462 comprises defining a virtual segment based on an average direction of the trajectory defined by the gesture. Step 464 comprises measuring a difference (8) between the virtual segment and the trajectory at a number n of different locations within the trajectory, thus obtaining a set of $\delta_{i=1-n}$. Step 466 comprises classifying the set of $\delta_{i=1-n}$ as a sample point in a multidimensional space of at least n dimensions, said multidimensional space including sample points for the user (Yes samples) and sample points for other people (No samples). Step 468 comprises determining a probability that the trajectory is drawn by the user based on a number of Yes samples and a number of No samples provided within a predefined volume around the sample point. Step 470 comprises outputting said probability to the system for comparison with a predetermined threshold to take an authentication decision or action based on said comparison.

Figure 19:
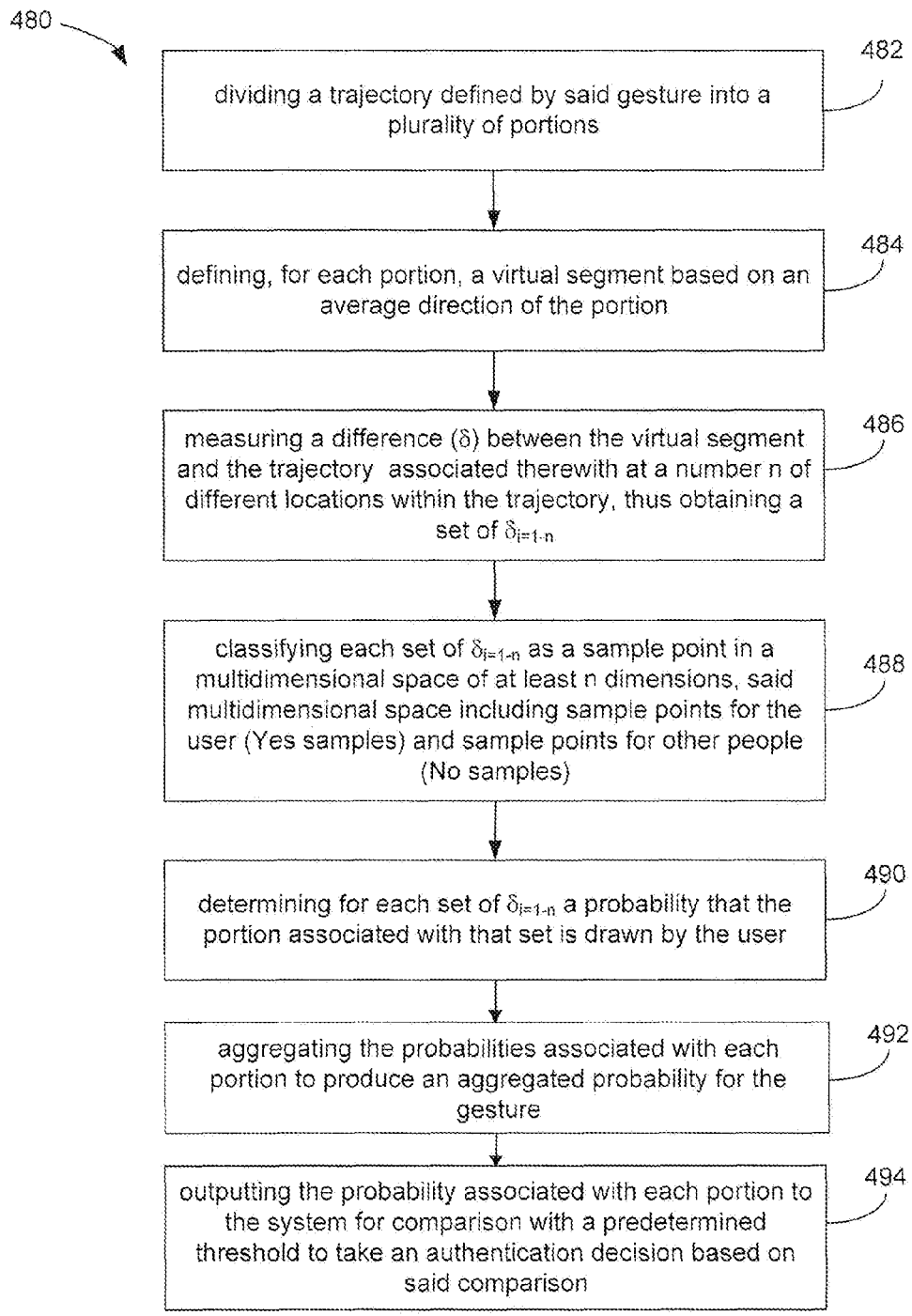
FIG. 19 is flowchart of a computer implemented method for authenticating a user into a system using a gesture drawn by the user, in accordance with yet another embodiment.

FIG. 19 is a flowchart of a computer implemented method 480 for authenticating a user into a system using a gesture drawn by the user. Step 482 comprises dividing a trajectory defined by said gesture into a plurality of portions. Step 484 comprises defining, for each portion, a virtual segment based on an average direction of the portion. Step 486 comprises measuring a difference ($\delta$) between the virtual segment and the trajectory associated therewith at a number n of different locations within the trajectory, thus obtaining a set of $\delta_{i=1-n}$. Step 488 comprises classifying each set of $\delta_{i=1-n}$ as a sample point in a multidimensional space of at least n dimensions, said multidimensional space including sample points for the user (Yes samples) and sample points for other people (No samples). Step 490 comprises determining for each set of $\delta_{i=1-n}$ a probability that the portion associated with that set is drawn by the user, based on a number of Yes samples and a number of No samples provided within a predefined volume around the sample point associated with each set of $\delta_{i=1-n}$. Step 492 comprises aggregating the probabilities associated with each portion to produce an aggregated probability for the gesture. Step 494 comprises outputting said aggregated probability to the system for comparison with a predetermined threshold to take an authentication decision or action based on said comparison.

Hardware and Operating Environment

Figure 20:
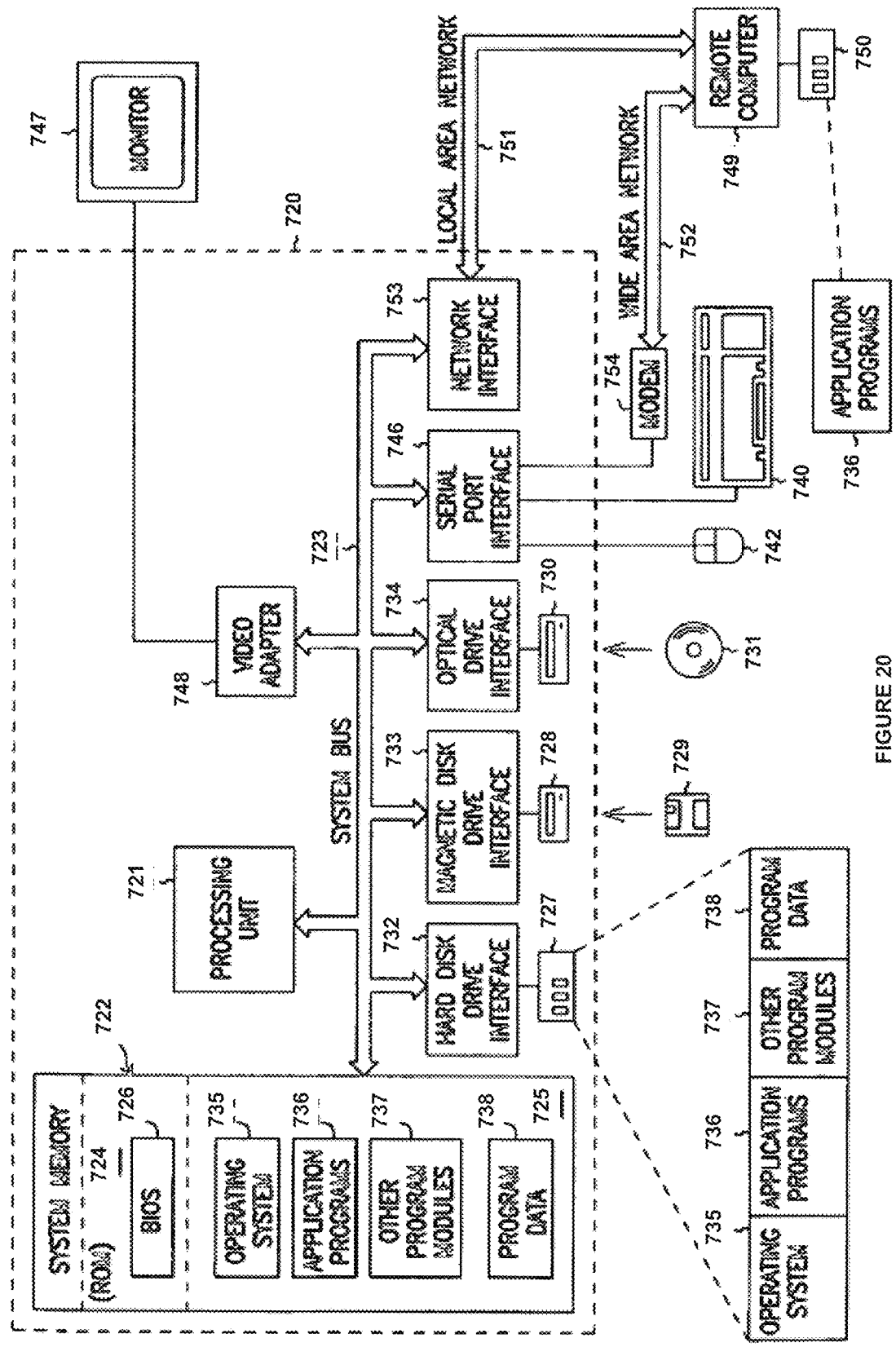
FIG. 20 illustrates an exemplary diagram of a suitable computing operating environment in which embodiments of the invention may be practiced.

FIG. 20 illustrates an exemplary diagram of a suitable computing operating environment in which embodiments of the invention may be practiced. The following description is associated with FIG. 20 and is intended to provide a brief, general description of suitable computer hardware and a suitable computing environment in conjunction with which the embodiments may be implemented. Not all the components are required to practice the embodiments, and variations in the arrangement and type of the components may be made without departing from the spirit or scope of the embodiments.

Although not required, the embodiments are described in the general context of computer-executable instructions, such as program modules, being executed by a computer, such as a personal computer, a hand-held or palm-size computer, Smartphone, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, cellular telephones, smart phones, display pagers, radio frequency (RF) devices, infrared (IR) devices, Personal Digital Assistants (PDAs), laptop computers, wearable computers, tablet computers, a device of the IPOD or IPAD family of devices manufactured by Apple Computer, integrated devices combining one or more of the preceding devices, or any other computing device capable of performing the methods and systems described herein. The embodiments may also be practiced in distributed computing environments where tasks are performed by remote processing devices that are linked through a communications network. In a distributed computing environment, program modules may be located in both local and remote memory storage devices.

The exemplary hardware and operating environment of FIG. 20 includes a general purpose computing device in the form of a computer 720, including a processing unit 721, a system memory 722, and a system bus 723 that operatively couples various system components including the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer; the embodiments are not so limited.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724.

In one embodiment of the invention, the computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media. In alternative embodiments of the invention, the functionality provided by the hard disk drive 727, magnetic disk 729 and optical disk drive 730 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the invention, the hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. A user may enter commands and information into the personal computer 720 through input devices such as a keyboard 740 and pointing device 742. Other input devices (not shown) may include a microphone, joystick, game pad, satellite dish, scanner, touch sensitive pad, or the like. These and other input devices are often connected to the processing unit 721 through a serial port interface 746 that is coupled to the system bus, but may be connected by other interfaces, such as a parallel port, game port, or a universal serial bus (USB). In addition, input to the system may be provided by a microphone to receive audio input.

A monitor 747 or other type of display device is also connected to the system bus 723 via an interface, such as a video adapter 748. In one embodiment of the invention, the monitor comprises a Liquid Crystal Display (LCD). In addition to the monitor, computers typically include other peripheral output devices (not shown), such as speakers and printers. The monitor may include a touch sensitive surface which allows the user to interface with the computer by pressing on or touching the surface.

The computer 720 may operate in a networked environment using logical connections to one or more remote computers, such as a remote computer 749. These logical connections are achieved by a communication device coupled to or a part of the computer 720; the embodiments is not limited to a particular type of communications device. The remote computer 749 may be another computer, a server, a router, a network PC, a client, a peer device or other common network node, and typically includes many or all of the elements described above relative to the computer 720, although only a memory storage device 750 has been illustrated in FIG. 7. The logical connections depicted in FIG. 7 include a local-area network (LAN) 751 and a wide-area network (WAN) 752. Such networking environments are commonplace in offices, enterprise-wide computer networks, intranets and the Internet.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer a hand-held or palm-size computer, a computer in an embedded system, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

While preferred embodiments have been described above and illustrated in the accompanying drawings, it will be evident to those skilled in the art that modifications may be made without departing from this disclosure. Such modifications are considered as possible variants comprised in the scope of the disclosure.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer implemented method for authenticating a user into a system using a gesture drawn by the user, the method comprising:
dividing a trajectory defined by said gesture into a plurality of portions;
defining, for each portion, a virtual segment based on an average direction of the portion;
measuring a difference (d) between the virtual segment and the trajectory associated therewith at a number n of different locations within the trajectory, thus obtaining a set of $d_{i=1-n}$;
classifying each set of $d_{i=1-n}$ as a sample point in a multi-dimensional space of at least n dimensions, said multi-dimensional space including sample points for the user (Yes samples) and sample points for other people (No samples);
determining for each set of $d_{i=1-n}$ a probability that the portion associated with that set is drawn by the user, said determining comprising:
counting a number of Yes samples and a number of No samples within a predefined volume around the sample point associated with the set of $d_{1-n}$;
calculating a first ratio of Yes samples versus No samples within the predefined volume;
dividing the first ratio by a second ratio representing the number of Yes samples versus No samples in the entire multidimensional space, to produce said probability;
aggregating the probabilities associated with each portion to produce an aggregated probability for the gesture;
outputting said aggregated probability to the system for comparison with a predetermined threshold to take an authentication decision or action based on said comparison.

2. The method of claim 1, further comprising:
associating a value representing a direction to each virtual segment; and
classifying the set of $d_{i=1-n}$ associated with the virtual segment in an n+1 dimensional space comprising one dimension for each di and one dimension for the value.

3. The method of claim 2, further comprising determining the value by comparing the virtual segment to a cardinal direction vector, wherein the value is an integer representing a number associated with one of the direction vectors.

4. The method of claim 3, further comprising concatenating the values associated with the virtual segments into a key-code, and outputting the key-code to the system for verification with a predefined key-code.

5. The method of claim 4, further comprising, if the key-code matches the predefined key-code, and the aggregated probability is lower than the predetermined threshold preventing the user from accessing the system.

6. The method of claim 3, wherein the cardinal direction vector comprises eight direction vectors.

7. The method of claim 2, wherein d=4, and the multidimensional space comprises 5 dimensions.

8. The method of claim 1, further comprising setting the size of the volume around the sample point as a function of a density of the multidimensional space such that the volume contains a predefined percentage of an entire count of samples in the multidimensional space.

9. The method of claim 1, further comprising setting the size of the volume around the sample point as a function of a smallest volume that may be found in the multidimensional space which includes a specific number of Yes samples.

10. The method of claim 1, further comprising performing a learning phase, said learning phase comprising:
prompting the user to perform said gesture for a number of times;
repeating the steps of detecting to classifying for each gesture;
classifying the sample points associated with each gesture in the multidimensional space as YES samples.

11. The method of claim 1, the method further comprising receiving the trajectory from a touch sensitive device.

12. The method of claim 1, further comprising building said trajectory from an image stream showing the gesture made using a meta-subject.

13. The method of claim 12, further comprising detecting a meta-subject and a position of said meta-subject in the image stream, and building said trajectory based on a sequential change of positions of the meta-subject in the image stream.

14. The method of claim 13, wherein detecting comprises scanning each image of the image stream in search for the meta-subject using a pre-loaded image of the meta-subject.

15. The method of claim 14 further comprising convoluting the images of the image stream and the pre-loaded image of the meta-subject and performing the comparison on binary versions of the images.

16. The method of claim 15, wherein scanning comprises:
dividing a given binary image of the image stream into a plurality of areas;
providing different versions of the binary image of the meta subject, each version having a different resolution, and dividing each version into one or more tiles, thus producing a number m of tiles from all the different versions;
performing a sum of square difference (SSD) between each area of the given image and each tile, to produce a set of SSD values including m SSD values;
classifying said set of SSD values as a sample point in an m-dimensional space including sample points representing images that include only the meta-subject (Yes samples) and images that do not include the meta-subject (No samples);
counting a number of Yes samples and a number of No samples within a predefined volume around the sample point associated with the area;
calculating a third ratio of Yes samples versus No samples within the predefined volume; and
dividing the third ratio by a fourth ratio representing the number of Yes samples versus No samples in the entire m-dimensional space, thus producing an image-probability indicative of the presence of the meta-subject in the given image.

17. The method of claim 16, wherein if the image-probability is greater than a predetermined threshold, outputting a position of the meta-subject in the given image.

18. The method of claim 17, further comprising outputting a size of the meta-subject in the given image.

19. The method of claim 18, further comprising setting dimensions of the areas based on the size of the meta-subject found in the given image.

20. The method of claim 16 further comprising:
morphing the binary image in a plurality of dimensions to produce morphed versions of the image of the meta-subject, and
repeating the steps of providing and performing for each morphed version to produce a plurality of sets of SSD values for each area;
outputting the SSD set having the lowest values for classification in the m-dimensional space.

21. The method of claim 16, wherein adjacent areas of the given image have overlapping pixels.

22. The method of claim 21, wherein each area is shifted by four pixels with respect to the next/previous area.

23. The method of claim 16, wherein the image of the meta-subject is an image of a body part.

24. The method of claim 23, wherein the body part is one of: eye, hand, head, fist, neck, ear.

25. The method of claim 21, wherein the image of the meta-subject is pre-loaded.

26. The method of claim 21, wherein the image of the meta-subject is received by the user and represents a body part of the user.

27. The method of claim 21, wherein the image of the meta-subject is pre-loaded and represents a body part of someone other than the user.

28. The method of claim 16, wherein the meta-subject is a physical object excluding body parts.

29. The method of claim 16, further comprising loading the sample points from a local database, a remote server, or both thereof.

30. The method of claim 29, wherein each sample point in the m-dimensional space represents a set of m-values associated with a different image.

31. The method of claim 16, further comprising scanning the image to detect an additional meta-subject, and upon detection of said additional meta-subject in the given image, increasing the image-probability.

32. The method of claim 10, further comprising:
detecting an average duration for performing the gesture; and
upon authentication, analyzing portions of the trajectory that are received within said average duration, thereby introducing errors that disqualify gestures that are slower or faster than the user gesture.

33. A computer implemented method for authenticating a user into a system using a gesture drawn by the user, the method comprising:
dividing a trajectory defined by said gesture into a plurality of portions;
defining, for each portion, a virtual segment based on an average direction of the portion;
measuring a difference (d) between the virtual segment and the trajectory associated therewith at a number n of different locations within the trajectory, thus obtaining a set of $d_{i=1-n}$;
classifying each set of $d_{i=1-n}$ as a sample point in a multi-dimensional space of at least n dimensions, said multi-dimensional space including sample points for the user (Yes samples) and sample points for other people (No samples);
determining for at least one set of $d_{i=1-n}$ a probability that the portion associated with that set is drawn by the user, said determining comprising:
counting a number of Yes samples and a number of No samples within a predefined volume around the sample point associated with the set of $d_{1-n}$;
calculating a first ratio of Yes samples versus No samples within the predefined volume;
dividing the first ratio by a second ratio representing the number of Yes samples versus No samples in the entire multidimensional space, to produce said probability;
outputting the probability associated with each portion to the system for comparison with a predetermined threshold to take an authentication decision or action based on said comparison.

34. An apparatus for authenticating a user into a system using a gesture drawn by the user, the system comprising:
a trajectory analyzer adapted to:
divide a trajectory defined by said gesture into a plurality of portions,
define, for each portion, a virtual segment based on an average direction of the portion;

measure a difference (d) between the virtual segment and the trajectory associated therewith at a number n of different locations within the trajectory, to obtaining a set of $d_{i=1-n}$;

an authentication module adapted to:

classify each set of $d_{i=1-n}$ as a sample point in a multidimensional space of at least n dimensions, said multidimensional space including sample points for the user (Yes samples) and sample points for other people (No samples); and determine for each set of $d_{i=1-n}$ a probability that the portion associated with that set is drawn by the user, by counting a number of Yes samples and a number of No samples within a predefined volume around the sample point associated with the set of $d_{i=1-n}$; calculating a first ratio of Yes samples versus No samples within the predefined volume; and dividing the first ratio by a second ratio representing the number of Yes samples versus No samples in the entire multidimensional space, to produce said probability;

a probability aggregator for aggregating the probabilities associated with each portion to produce an aggregated probability for the gesture, wherein the aggregated probability is sent to the system for comparison with a predetermined threshold to take an authentication decision or a decision based on said comparison.

35. The apparatus of claim 34, wherein the apparatus associates a value representing a direction to each virtual segment; and classifies the set of $d_{i=1-n}$ associated with the virtual segment in an n+1 dimensional space comprising one dimension for each di and one dimension for the value.

36. The apparatus of claim 35, wherein the apparatus determines the value by comparing the virtual segment to a cardinal direction vector, wherein the value is an integer representing a number associated with one of the direction vectors.

37. The apparatus of claim 36, wherein the apparatus concatenates the values associated with the virtual segments into a key-code, and outputs the key-code to the system for verification with a predefined key-code.

38. The apparatus of claim 37, wherein the apparatus prevents the user from accessing the system if the key-code matches the predefined key-code, and the aggregated probability is lower than the predetermined threshold.

39. The apparatus of claim 36, wherein the cardinal direction vector comprises eight direction vectors.

40. The apparatus of claim 35, wherein d=4, and the multidimensional space comprises 5 dimensions.

41. The apparatus of claim 34, wherein the apparatus sets the size of the volume around the sample point as a function of a density of the multidimensional space such that the volume contains a predefined percentage of an entire count of samples in the multidimensional space.

42. The apparatus of claim 34, wherein the apparatus sets the size of the volume around the sample point as a function of a smallest volume that may be found in the multidimensional space which includes a specific number of Yes samples.

43. The apparatus of claim 34, wherein the apparatus performs a learning phase, said learning phase comprising:

prompting the user to perform said gesture for a number of times;

repeating the steps of detecting to classifying for each gesture;

classifying the sample points associated with each gesture in the multidimensional space as YES samples.

44. The apparatus of claim 34, wherein the apparatus receives the trajectory from a touch sensitive device.

45. The apparatus of claim 34, wherein the apparatus builds the trajectory from an image stream showing the gesture made using a meta-subject.

46. The apparatus of claim 45, wherein the apparatus detects a meta-subject and a position of said meta-subject in the image stream, and builds said trajectory based on a sequential change of positions of the meta-subject in the image stream.

47. The apparatus of claim 46, wherein the apparatus scans each image of the image stream in search for the meta-subject using a pre-loaded image of the meta-subject.

48. The apparatus of claim 47, wherein the apparatus convolutes the images of the image stream and the pre-loaded image of the meta-subject and performs the comparison on binary versions of the images.

49. The apparatus of claim 48, wherein the apparatus is adapted to:

divide a given binary image of the image stream into a plurality of areas;

provide different versions of the binary image of the meta subject, each version having a different resolution, and divide each version into one or more tiles, thus producing a number m of tiles from all the different versions;

perform a sum of square difference (SSD) between each area of the given image and each tile, to produce a set of SSD values including m SSD values;

classify said set of SSD values as a sample point in an m-dimensional space including sample points representing images that include only the meta-subject (Yes samples) and images that do not include the meta-subject (No samples);

count a number of Yes samples and a number of No samples within a predefined volume around the sample point associated with the area;

calculate a third ratio of Yes samples versus No samples within the predefined volume; and divide the third ratio by a fourth ratio representing the number of Yes samples versus No samples in the entire m-dimensional space, thus producing an image-probability indicative of the presence of the meta-subject in the given image.

50. The apparatus of claim 49, wherein the apparatus outputs a position of the meta-subject in the given image if the image-probability is greater than a predetermined threshold.

51. The apparatus of claim 50, wherein the apparatus outputs a size of the meta-subject in the given image.

52. The apparatus of claim 51, wherein the apparatus sets dimensions of the areas based on the size of the meta-subject found in the given image.

53. The apparatus of claim 49, wherein the apparatus is adapted to:

morph the binary image in a plurality of dimensions to produce morphed versions of the image of the meta-subject, and repeat the steps of provide and perform for each morphed version to produce a plurality of sets of SSD values for each area; and output the SSD set having the lowest values for classification in the m-dimensional space.

54. The apparatus of claim 49, wherein adjacent areas of the given image have overlapping pixels.

55. The apparatus of claim 54, wherein each area is shifted by four pixels with respect to the next/previous area.

56. The apparatus of claim 49, wherein the image of the meta-subject is a body part.

57. The apparatus of claim 56, wherein the body part is one of: eye, hand, head, fist, neck, ear.

58. The apparatus of claim 49, wherein the image of the meta-subject is pre-loaded.

59. The apparatus of claim 49, wherein the image of the meta-subject is received by the user and represents a body part of the user.

60. The apparatus of claim 49, wherein the image of the meta-subject is pre-loaded and represents a body part of someone other than the user.

61. The apparatus of claim 49, wherein the meta subject is a physical object excluding body parts.

62. The apparatus of claim 49, wherein the apparatus loads the sample points from a local database, a remote server, or both thereof.

63. The apparatus of claim 62, wherein each sample point in the m-dimensional space represents a set of m-values associated with a different image.

64. The apparatus of claim 49, wherein the system scans the image to detect an additional meta-subject, and upon detection of said additional meta-subject in the given image, increasing the image-probability.

65. The apparatus of claim 43, wherein the apparatus detects an average duration for performing the gesture; and analyzes only portions of the trajectory that are received within said average duration, thereby introducing errors that disqualify gestures that are slower or faster than the user gesture.

66. The apparatus of claim 34, wherein the apparatus is embedded within the system.

67. The apparatus of claim 34, wherein the apparatus sends the aggregated probability to the system over a telecommunications network.

\* \* \* \* \*